United States Patent
Prescenzi et al.

(10) Patent No.: US 12,070,797 B1
(45) Date of Patent: Aug. 27, 2024

(54) DIRECT METAL DEPOSITION OF ELECTRONIC DEVICE COMPONENTS

(71) Applicant: Apple Inc., Cupertino, CA (US)

(72) Inventors: Anthony D. Prescenzi, Santa Clara, CA (US); Abhijeet Misra, Sunnyvale, CA (US); Adam T. Clavelle, San Francisco, CA (US); Eric W. Hamann, Santa Clara, CA (US); Isabel Yang, San Jose, CA (US); Brian M. Gable, San Jose, CA (US); James A. Yurko, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 183 days.

(21) Appl. No.: 17/447,790

(22) Filed: Sep. 15, 2021

Related U.S. Application Data

(63) Continuation of application No. 17/138,488, filed on Dec. 30, 2020, now abandoned.

(60) Provisional application No. 63/027,801, filed on May 20, 2020.

(51) Int. Cl.
| | |
|---|---|
| *B33Y 80/00* | (2015.01) |
| *B22F 10/25* | (2021.01) |
| *B22F 10/66* | (2021.01) |
| *B32B 15/01* | (2006.01) |
| *B33Y 10/00* | (2015.01) |
| *B33Y 40/20* | (2020.01) |

(52) U.S. Cl.
CPC .............. *B22F 10/25* (2021.01); *B22F 10/66* (2021.01); *B32B 15/01* (2013.01); *B33Y 10/00* (2014.12); *B33Y 40/20* (2020.01); *B33Y 80/00* (2014.12)

(58) Field of Classification Search
CPC ................. B33Y 80/00; Y10T 428/12188
See application file for complete search history.

(56) References Cited

U.S. PATENT DOCUMENTS

| | | | |
|---|---|---|---|
| 7,139,633 | B2 | 11/2006 | Mazumder et al. |
| 8,617,661 | B2 | 12/2013 | Newkirk et al. |
| 10,090,877 | B2 | 10/2018 | Rayner |
| 10,478,897 | B2 | 11/2019 | Tong |
| 2010/0061040 | A1 | 3/2010 | Dabov et al. |
| 2012/0076573 | A1 | 3/2012 | Pilliod et al. |
| 2012/0250250 | A1 | 10/2012 | Tatebe |
| 2013/0286627 | A1 | 10/2013 | Lee et al. |
| 2015/0261267 | A1 | 9/2015 | Vadakkanmaruveedu et al. |
| 2016/0174398 | A1 | 6/2016 | Ido |
| 2016/0207236 | A1 | 7/2016 | Tsubota et al. |

(Continued)

FOREIGN PATENT DOCUMENTS

| | | |
|---|---|---|
| DE | 3732206 A1 | 4/1989 |
| GB | 1373962 A | 11/1974 |

OTHER PUBLICATIONS

Manufacturing Tomorrow, https://www.manufacturingtomorrow.com/article/2018/09/how-real-value-of-metal-additive-manufacturing-can-be-leveraged-for-automotive-production/12149, dated Sep. 13, 2018. (Year: 2018).*

(Continued)

*Primary Examiner* — Adam Krupicka
(74) *Attorney, Agent, or Firm* — Dorsey & Whitney LLP

(57) ABSTRACT

A 3D printed metallic structure can include an elongated body defining an orifice, the elongated body divisible into a plurality of sectioned elements. The plurality of sectioned elements configured for use a housing or enclosures of electronic devices.

8 Claims, 23 Drawing Sheets

(56) References Cited

U.S. PATENT DOCUMENTS

| | | |
|---|---|---|
| 2016/0320658 A1 | 11/2016 | Reightler et al. |
| 2017/0035156 A1 | 2/2017 | Wright et al. |
| 2017/0069956 A1 | 3/2017 | Hill et al. |
| 2017/0196110 A1 | 7/2017 | Shinn |
| 2017/0252820 A1* | 9/2017 | Myerberg ............... B22F 12/10 |
| 2018/0017995 A1 | 1/2018 | Gable et al. |
| 2018/0103557 A1 | 4/2018 | Wright et al. |
| 2019/0045642 A1 | 2/2019 | Prest et al. |
| 2019/0254185 A1 | 8/2019 | Cater et al. |

OTHER PUBLICATIONS

Additive takes center stage, the Engineer, https://www.theengineer.co.uk/content/opinion/additive-takes-centre-stage/, Jul. 2017. (Year: 2017).*

Wayback machine capture of "Stainless Steel 316L 3D printing material" <https://web.archive.org/web/20191226045423/https://www.sculpteo.com/en/materials/binder-jetting-material/binder-jetting-stainless-steel-316/> dated Dec. 26, 2019 . (Year: 2019).*

PCT International Search Report and Written Opinion for International Application No. PCT/US2019/061734, mailed May 15, 2020 (34 pp.).

Dutta, B. et al., "Additive Manufacturing by Direct Metal Deposition", Advanced Materials & Processes, May 2011, pp. 33-36.

Kikuchi, T. et al., "Porous Aluminum Oxide Formed by Anodizing in Various Electrolyte Species", Current nanoscience, 11(5), https://doi.org/10.2174/1573413711999150608144742, 2015, pp. 560-657.

Norek, M. et al., "Manufacturing of Highly Ordered Porous Anodic Alumina with Conical Pore Shape and Tunable Interpore Distance in the Range of 550 nm to 650 nm", Materials Science-Poland, 35(3), http://www.materialsscience.pwr.wroc.pl/, DOI: 10.1515/msp-2017-0058, 2017, pp. 511-518.

Trumpf, "Laser Metal Deposition: Tapping New Potential with Deposition Techniques", TRUMPF Laser-und Systemtechnik, GmbH, available at least as early as Dec. 23, 2020, 8 pp.

Wang, Q. et al., "Fabrication of highly ordered porous anodic alumina membrane with ultra-large pore intervals in ethylene glycol-modified citric acid solution", J Porous Mater (2013) 20:785-788, DOI 10.1007/s10934-012-9653-3, Nov. 8, 2012.

* cited by examiner

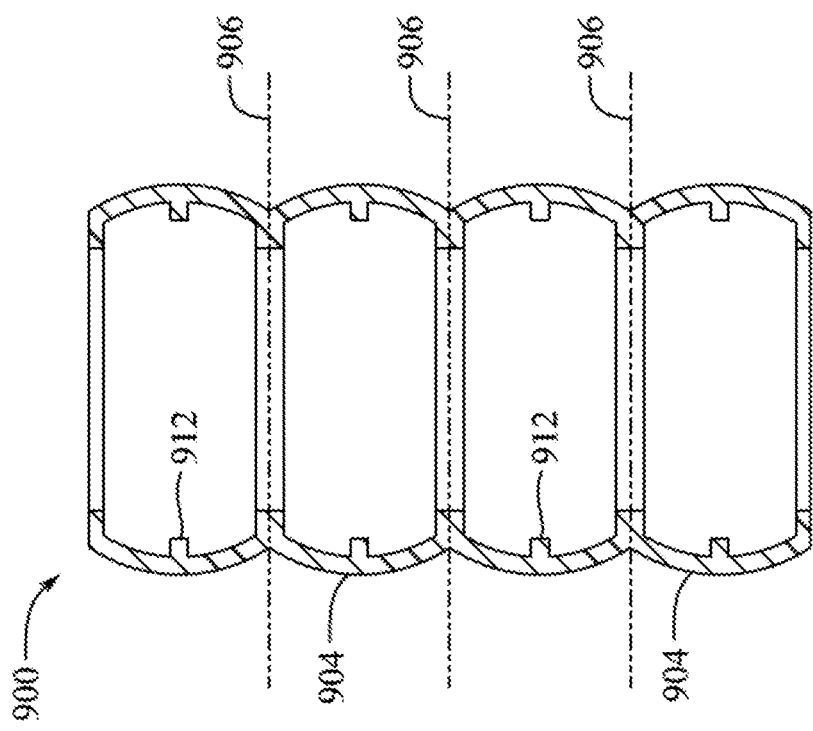
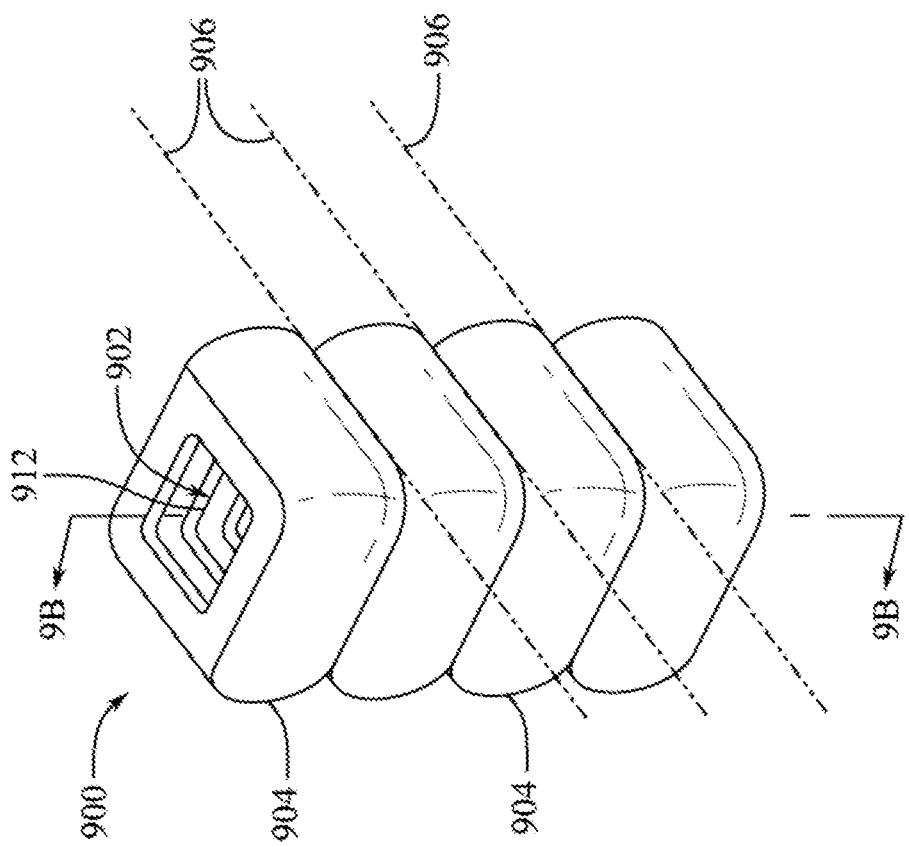
FIG. 9B
FIG. 9A

DIRECT METAL DEPOSITION OF ELECTRONIC DEVICE COMPONENTS

CROSS-REFERENCE TO RELATED APPLICATION(S)

This is a continuation of U.S. patent application Ser. No. 17/138,488, filed 30 Dec. 2020, and entitled "DIRECT METAL DEPOSITION OF ELECTRONIC DEVICE COMPONENTS," which claims priority to U.S. Provisional Patent Application No. 63/027,801, filed 20 May 2020, and entitled "DIRECT METAL DEPOSITION OF ELECTRONIC DEVICE COMPONENTS," the entire disclosures of which are hereby incorporated by reference.

FIELD

The described embodiments relate generally to electronic device components formed using additive manufacturing processes. More particularly, the present examples relate to device enclosures formed using direct metal deposition.

BACKGROUND

Electronic devices are widespread in society and can take a variety of forms, from wristwatches to computers. Electronic devices, including portable electronic devices such as handheld phones, tablet computers, and watches, generally include a type of housing or enclosure to house the internal components.

Often, the housing or enclosures are very detailed housings including fine surface finishes, complex geometries, and intricate features that are used to enhance the function and performance of the electronic devices. The manufacture of such enclosures or housings using traditional methodologies can be slow, labor intensive, require multiple machining and polishing steps, and result in relatively large quantities of material waste.

Additionally, due to the increased performance and functionality expected from consumer electronic devices, it is often desirable for enclosures or housings to be formed from a combination of multiple materials that impart different material properties. The combination of multiple materials in complex design configurations can introduce complications into traditional manufacturing processes. For example, device enclosures formed of multiple materials can require increased processing time to join the disparate materials, added material and material waste, and increased cost when manufactured using traditional techniques. In some examples, common manufacturing processes may not be capable of producing a device enclosure with a desired combination of properties. Accordingly, it can be desirable to provide processing and manufacturing techniques that allow for efficient, low cost, and low waste production of device enclosures having a desired combination of differing properties.

SUMMARY

According to some aspects of the present disclosure, a 3D printed metallic structure can include an elongated body defining an orifice, the elongated body divisible into a plurality of sectioned elements.

In some examples, the orifice extends along a longitudinal axis of the elongated body. Each sectioned element can include a sidewall that at least partially defines an internal volume for an electronic device. The elongated body can be non-symmetrical about one or more axes. The elongated body can include internal features disposed on a sidewall that at least partially defines the orifice, and the internal features can be integrally formed with the sidewall.

In some examples, each sectioned element includes a back wall and a sidewall that extends from a periphery of the back wall. The sidewall and the back wall can at least partially define a housing for an electronic device. The elongated body can include two or more metals. In some examples, the elongated body includes a first metal that at least partially defines an exterior surface of the elongated body, and a second, different metal that at least partially defines the orifice. The elongated member can include at least one of steel, titanium, or aluminum.

According to some examples, a 3D printed metallic part can include a substrate including a first metal, and a printed feature disposed on the substrate, the printed feature including a second, different metal.

In some examples, at least one of the first metal or the second metal can include at least one of steel, titanium, or aluminum. The substrate can be 3D printed and the printed feature can at least partially surround a periphery of the substrate. In some examples, the substrate can define a first portion of an exterior surface and an interface surface, and the printed feature can be joined to the substrate at the interface surface and can define a second portion of the exterior surface opposite the first portion. The substrate can at least partially define an internal volume of an electronic device housing, and the printed feature can at least partially define an exterior surface of the electronic device housing.

According to some examples, a method of forming a part can include forming a sectionable structure using an additive manufacturing process, and separating the sectionable structure into two or more sections.

In some examples, the method includes performing a subtractive manufacturing processes on the sections. The subtractive manufacturing process can include machining. The additive manufacturing process can include a direct metal deposition process. The direct metal deposition process can include printing the sectionable structure from at least one of a powder or wire feedstock.

BRIEF DESCRIPTION OF THE DRAWINGS

The disclosure will be readily understood by the following detailed description in conjunction with the accompanying drawings, wherein like reference numerals designate like structural elements, and in which:

FIG. 9A shows a perspective view of a sectionable structure including sections having internal features.

FIG. 9B shows a cross-sectional side view of the sectionable structure of FIG. 9A.

DETAILED DESCRIPTION

Figure 1A:
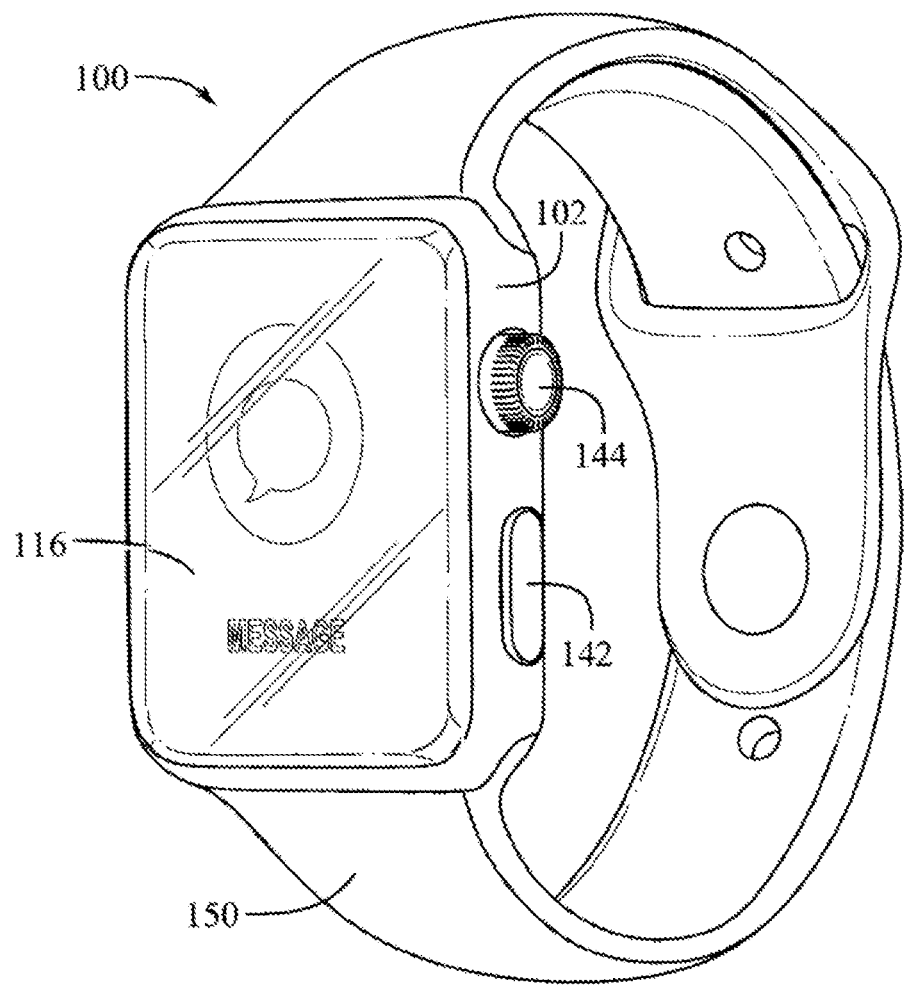
FIG. 1A shows a perspective view of an electronic device.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components, as appropriate. For instance, methods described can be performed in an order different from that described, and various steps can be added, omitted, or combined. Also, features described with respect to some embodiments can be combined in other embodiments.

In some examples, an electronic device housing can be formed by separating a section from an elongated body. The separated section can approximate the final shape and finish of the electronic device housing. The elongated body can include multiple sectionable elements or sections and can be formed using direct metal deposition. As used herein, the term sectionable element can refer to any portion of a structure that can be physically separated or removed from the remainder of the structure as a single integral element. The separated or sectioned sectionable element can include a finished part or component, or can be subjected to additionally processing to form a final part or component.

Additionally, features can be formed into the elongated body during the formation process, or can be machined or otherwise formed into or onto the separated section using subtractive manufacturing techniques.

Additive manufacturing, also referred to as 3D printing, can refer to processes to form 3-dimensional components by depositing material over a substrate or other portion of material. The materials used in additive manufacturing processes can include metals, plastics, ceramics, and composite materials. In some examples, the additive manufacturing processes described herein can deposit metal or metallic materials. In some examples, the processes can use a metallic powder or a wire feedstock to deposit the material.

Additive manufacturing processes can be used to form parts including metallic materials. For example, methods of 3D metal printing include Direct Metal Deposition (DMD), Laser Metal Deposition (LMD), Direct Energy Deposition (DED), Selective Laser Sintering (SLS), Direct Metal Laser Sintering (DMLS), Electron beam melting (EBM) and Selective laser melting (SLM). In some examples, and with some specific component designs, 3D metal printing can offer several advantages over conventional technologies of casting, forging, and machining.

3D metal printing technology allows for the production of metallic structures directly from metallic powders or wires. In some examples, 3D printing allows for the building of complex and diverse shapes that are not possible to form using traditional methods. Moreover, 3D printing can result in a reduction in material waste due to the additive nature of the process. Traditional subtractive manufacturing methods can generate a large amount of material waste, depending on the component design. In some examples, the techniques and methods described herein, such as 3D printing, can be implemented to reduce time and material costs in the development of components for electronic devices, such as housings or enclosures.

In some examples, additive manufacturing can be used to build or form a 3D printed metallic structure. The 3D printed metallic structure can approximate the final shape and finish of a component for an electronic device, such as a housing or enclosure. For example, when forming a housing or enclosure for an electronic device, the shape and finish of the 3D printed metallic structure can be substantially similar to the shape and finish of the finalize housing. The printed structure can then undergo any desired additional processing, such as suitable machining, finishing, or subtractive manufacturing processes to form the finalized housing. In some examples, the use of a 3D printed structure as compared to a cast or forged structure can significantly reduce the amount of additional processing, such as subtractive processing, that is required to produce a desired component.

In some examples, the additive manufacturing process can include a direct metal deposition process. In some examples, a direct metal deposition process can include printing an elongated sectionable structure from at least one of a powder or wire feedstock. The elongated body can be divided or separated into sectioned elements that can ultimately be used as independent electronic device components, such as housings. In some examples, by printing an elongated body which is subsequently divided into sectioned units, the additive manufacturing process is able to continuously run and produce components, thereby saving time and costs on start-up and shut-down operations.

In some examples, each sectioned element can be identical, or substantially similar, to one another. In some examples, intentional differences between the sectioned elements of the elongated structure can be introduced. The sectioned elements can be defined in the elongated sectionable structure by variations in the elongated sidewall itself.

That is, the elongated sectionable structure can be formed with physical variations in the elongated sidewall indicating desired separation locations. Alternatively, in some examples, there is no physical variation or difference in the structure of the sidewall or elongated structure. The elongated structure can be divided or separated into sections by any suitable systems or methods, such as slicing, cutting, pulling apart, shearing, chopping, or any other method or combination of methods to separate the elongated structure into its sectioned elements at desired locations. Separation processes can be mechanical, thermal, electro-magnetic, chemical, or combinations thereof.

Each sectioned element can be a blank, a forging stock, a slug, a multiple, or any other raw material stock. The sectioned element can approximate the final shape of a component for an electronic device. In this manner, traditional formation processes, such as a forging process, can be omitted and forging constraints on material efficiency can be avoided.

The 3D printed metallic structure can include an elongated body that defines an orifice. For example, metallic material can be deposited along a boundary or perimeter to define the orifice. In some examples, successive layers then build the structure up vertically to form sidewalls and to further define the orifice. By not depositing any, or only selectively depositing, material in a central region of the structure, the sidewalls define an orifice or hole. The orifice can extend along a longitudinal axis of the elongated body.

The elongated body can then be divided or otherwise separated into a plurality of sections or sectioned elements. In some examples, where the sectioned elements can include housings, each sectioned element can include a sidewall that at least partially defines an internal volume for an electronic device. In some examples, the sectioned element can further include a back wall. In some examples, the sidewalls can extend from at least a portion of a periphery of the back wall to form a cup or bowl-like shape. In this manner, the sidewall and the back wall can at least partially form a housing for an electronic device.

In some examples, the elongated body is cut perpendicular to the longitudinal axis of the body. As such, each section element can define a hole at a central region thereof. Various electrical components of the electronic device can be securely disposed within the opening of the sectioned element to form the electronic device.

In some examples, a component such as a housing can define various features such as protrusions, indentations, cavities, holes, bosses, ridges, or any other feature configured to interact with, engage with, or secure one or more components of an electronic device. The internal features can be integrally formed with the sidewall. In some examples, the internal features are formed using a subtractive manufacturing processes, such as machining, on the sections. In some examples, the features are printed concurrently with the elongated structure. In other examples, the features are printed onto the sectioned element after the sectioned elements have been separated into individual sections.

Advantageously, the features and overall shape of the elongated structure can be formed directly onto the structure during the printing process, thereby reducing or removing the need for additional processing or machining after separation of the sections. The ability to print features directly into the sectioned elements during the additive manufacturing process can reduce material waste, manufacture time, and operating costs.

In some examples, the features can be formed in one or both of the exterior and the interior of the elongated structure. In some examples, the features can act as an attachment feature for other components of the electronic device. The features can be configured to receive components of an electronic device, such as buttons or input components. The features can take any desired form or shape. In some examples, the features can extend, at least partially, into the interior sidewall to a desired depth. In some examples, the features can extend substantially entirely through an entire thickness of the sidewall. In some examples, the features can have a major dimension from about a micron up to about a millimeter, or several millimeters or more.

The elongated body or structure can be formed from any suitable material. For example, the elongated body can be formed from at least one of steel, titanium, copper, or aluminum. The elongated body can include two or more metals. In some examples, the elongated body includes a first metal that at least partially defines an exterior surface of the elongated body, and a second, different metal that at least partially defines the orifice. According to some examples, a 3D printed metallic part can include a substrate including a first metal, and a printed feature disposed on the substrate, the printed feature including a second, different metal. The substrate can be 3D printed, and the printed feature can at least partially surround a periphery of the substrate. In some examples, the substrate can define both a first portion of an exterior surface and an interface surface, and the printed feature can be joined to the substrate at the interface surface and can define a second portion of the exterior surface opposite the first portion. The substrate can at least partially define an internal volume of an electronic device housing, and the printed feature can at least partially define an exterior surface of the electronic device housing.

Reference will now be made in detail to representative examples illustrated in the accompanying drawings. It should be understood that the following descriptions are not intended to limit the examples to one preferred embodiment. To the contrary, it is intended to cover alternatives, modifications, and equivalents as can be included within the spirit and scope of the described examples, as defined by the appended claims.

These and other examples are discussed below with reference to FIGS. 1A-11. However, those skilled in the art will readily appreciate that the detailed description given herein with respect to these Figures is for explanatory purposes only, and should not be construed as limiting.

Figure 1B:
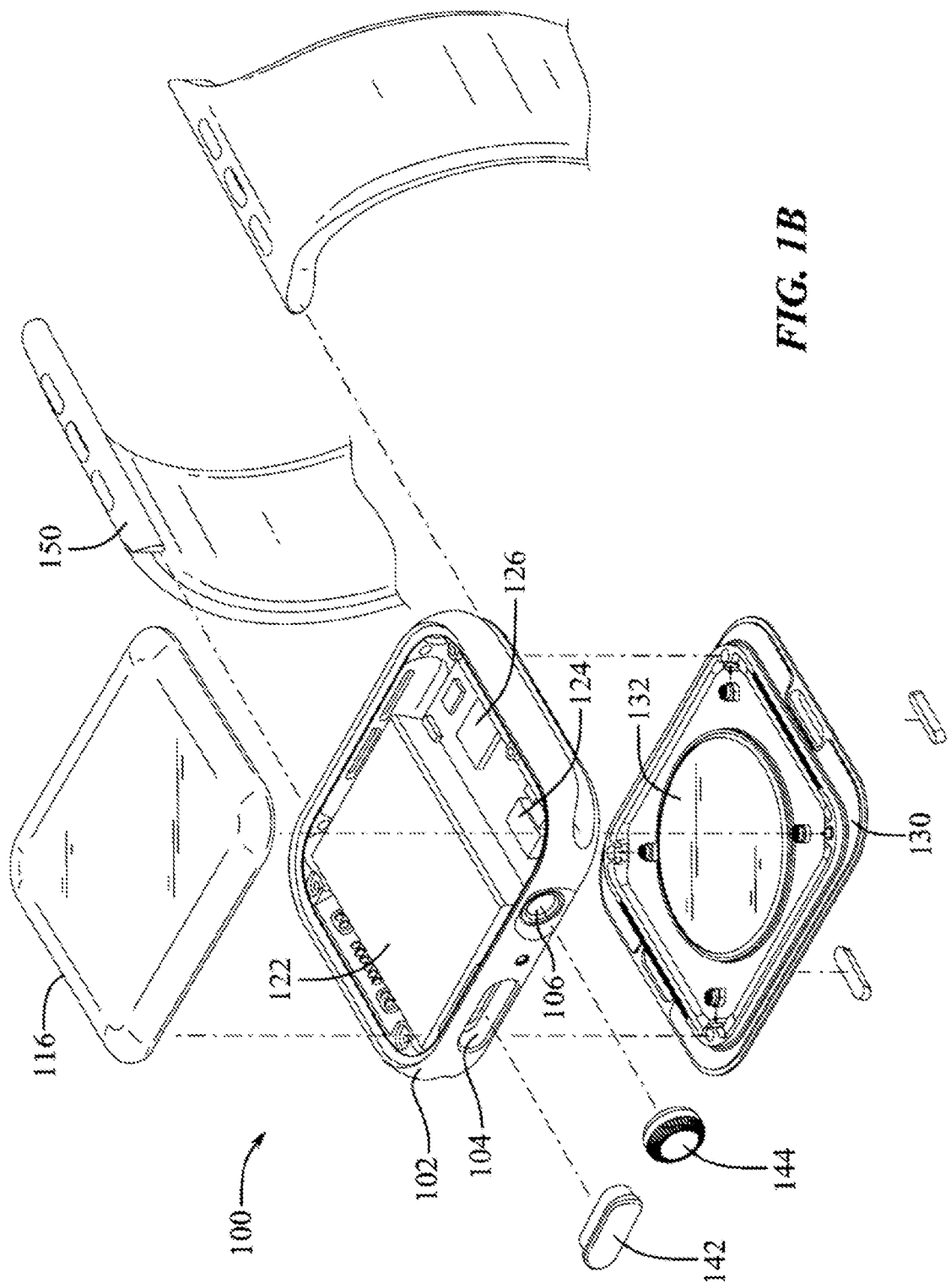
FIG. 1B shows an exploded view of the electronic device of FIG. 1A.
Figure 1C:
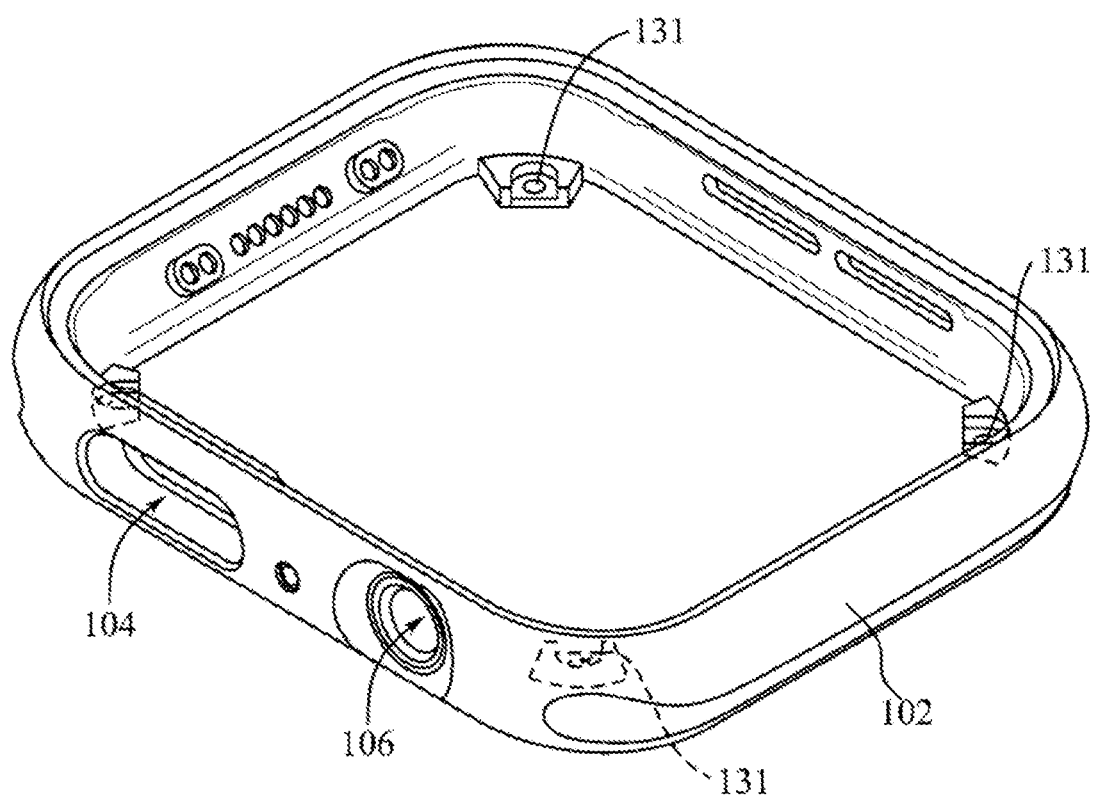
FIG. 1C shows a perspective view of an enclosure of the electronic device of FIG. 1A.

FIG. 1A shows an example of an electronic device 100. The electronic device shown in FIG. 1 is a watch, such as a smartwatch. The smartwatch of FIG. 1 is merely one representative example of a device that can be used in conjunction with the components and methods disclosed herein. The electronic device 100 can correspond to any form of a wearable electronic device, a portable media player, a media storage device, a portable digital assistant ("PDA"), a tablet computer, a computer, a mobile communication device, a GPS unit, a remote control device, and the like. The electronic device 100 can be referred to as an electronic device, a device, or a consumer device. The electronic device 100 includes a main housing or enclosure 102. The housing or enclosure 102 can be connected to a front cover 116 and can have a strap 150 attached thereto. A number of input elements, such as a rotatable crown 144 and/or a button 142 can be attached to and can protrude from the housing 102. Further details of the electronic device 100 are provided below with reference to FIGS. 1B and 1C.

Referring now to FIG. 1B, the housing 102 can substantially define at least a portion of an exterior surface of the device 100. The cover 116 can include glass, plastic, or any other substantially transparent material, component, or assembly. The cover 116 can cover or otherwise overlay a display, a camera, a touch sensitive surface, such as a touchscreen, or other component of the device 100. The cover 116 can define a front exterior surface of the device 100. A back cover 130 can also be attached to the housing 102, for example, opposite the cover 116. The back cover 130 can include ceramic, plastic, metal, or combinations thereof. In some examples, the back cover 130 can include an electromagnetically transparent portion 132. The electromagnetically transparent portion 132 can be transparent to any wavelength of electromagnetic radiation, such as visual light, infrared light, radio waves, or combinations thereof. Together, the housing 102, the cover 116, and the back cover 130 can substantially define an interior volume and an exterior surface of the device 100. In some examples, the housing 102 defines at least a portion of the back cover 130, such that the back cover 130 and the housing 102 are integrally formed. The housing 102 can be formed from a metallic material. As discussed in greater detail below, the housing 102 can be formed using an additive manufacturing process, such as direct metal deposition. In some examples, the housing 102 can also include a surface layer formed by a physical vapor deposition process.

The housing 102 can be a substantially continuous or unitary component, and can include one or more openings 104, 106 to receive components, such as components 142 and 144 of the electronic device 100, and/or to provide access to an internal portion of the electronic device 100. Additionally, other components of the electronic device 100 can be formed from, or can include, a metallic material formed using the methods and techniques described herein.

The electronic device 100 can further include a strap 150, or other component designed to attach the device 100 to a user, or to provide wearable functionality. In some examples, the strap 150 can be a flexible material that can comfortably allow the device 100 to be retained on a user's body at a desired location. Further, the housing 102 can include a feature or features that can provide attachment locations for the strap 150. In some examples, the strap 150 can be retained on the housing 102 by any desired techniques. For example, the strap 150 can include any combination of magnets that are attracted with magnets disposed within the housing 102, or the strap 150 can include retention components that mechanically retain the strap 150 against the housing 102.

The device 100 can also include internal components, such as a haptic engine 124, a battery 122, and a system in package (SiP), including one or more integrated circuits 126, such as processors, sensors, and memory. The SiP can also include a package. All or a portion of one or more internal components can be contained within the housing 102.

The internal components, such as one or more of components 122, 124, 126, can be disposed within an internal volume defined at least partially by the housing 102, and can be affixed to the housing 102 via internal surfaces, attachment features, threaded connectors, studs, posts, or other features that are formed into, defined by, or otherwise part of the housing 102 and/or the cover 116 or back cover 130. In some examples, the attachment features can be formed relatively easily on interior surfaces of the housing 102, for example, by machining. In some examples, the attachment features can be formed during the additive manufacturing process, as described herein.

The housing 102 formed from a metallic material can be conformable to interior dimensional requirements, as defined by the internal components 122, 124, 126. For example, the structure of the housing 102 can be defined or limited exclusively or primarily by the internal components the housing 102 is designed to accommodate. That is, the housing 102 can be shaped to house the interior components 122, 124, 126 in a dimensionally efficient manner without being constrained by factors other than the dimensions of the components, such as conventional manufacturing limitations.

Referring now to FIG. 1C, a perspective view of the housing 102 of the electronic device 100 is shown. The housing 102 can represent a 3D metal printed structure that is partially or entirely formed using the additive manufacturing processes described herein. The illustration of FIG. 1C can be representative of the shape and design of the structure immediately after printing, or can represent a finalized housing that has undergone additional processing, such as machining.

The housing 102 can also include features, such as such as speaker ports, button apertures, or charging port apertures. As shown, apertures 104, 106, can be integrally formed in the housing 102. In some examples, protruding features 131 can also be integrally formed in the housing 102 by the processes described herein. The features 131 can engage with fasteners when assembling the electronic device, while features 104 and 106 can be configured to receive buttons or inputs of the electronic device. As discussed in greater detail below, the housing 102 can be formed or machined to define the features.

Figure 2A:
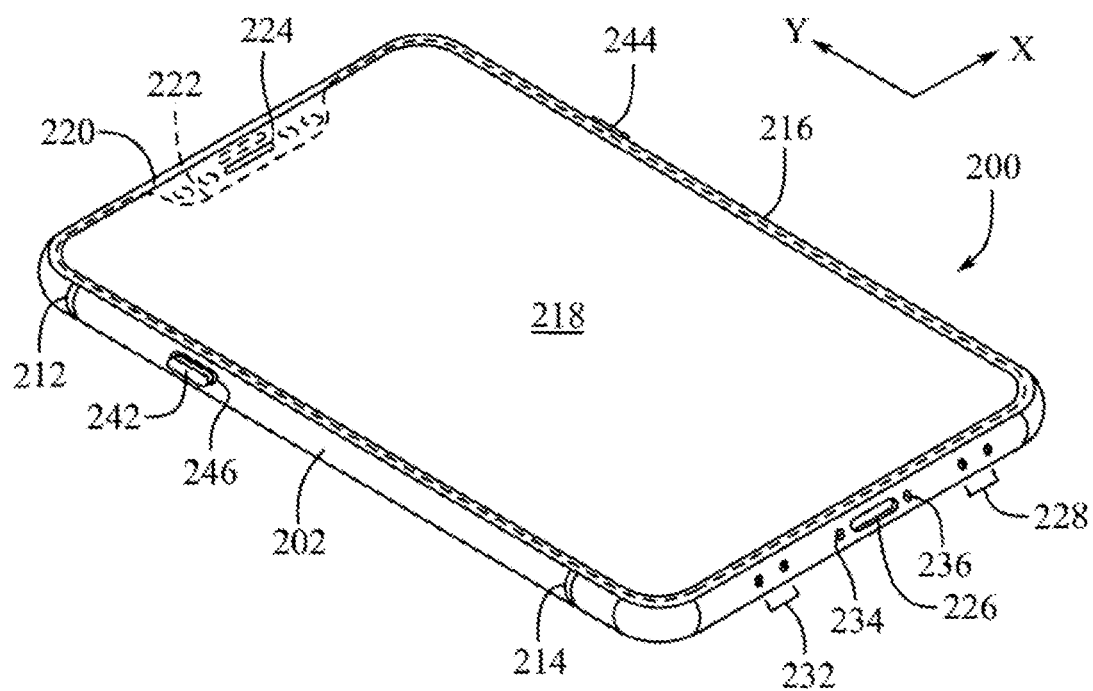
FIG. 2A shows a perspective view of an electronic device.

FIG. 2A illustrates a perspective view of an embodiment of an electronic device 200. The electronic device 200 shown in FIG. 2A is a mobile wireless communication device, such as a smartphone. The smartphone of FIG. 2A is merely one representative example of a device that can be used in conjunction with the systems and methods disclosed herein. Electronic device 200 can correspond to any form of wearable electronic device, a portable media player, a media storage device, a portable digital assistant ("PDA"), a tablet computer, a computer, a mobile communication device, a GPS unit, a remote control device, or other electronic device. The electronic device 200 can be referred to as an electronic device, a consumer device, or simply as a device.

The electronic device 200 can have a housing that includes a band or a frame 202 that defines an outer perimeter of the electronic device 200. The frame 202 can be formed using substantially similar methods used to form housing 102. The frame 202, or portions thereof, can be or include a printed metallic component, as described herein. In some examples, the frame 202 can define one or more sidewall components of the electronic device 200. In some examples, the frame 202 defines a non-continuous perimeter of the electronic device 200. That is, the frame 202 can be formed with gaps or spaces therein.

In some examples, the frame 202 includes an antenna assembly (not shown in FIG. 2A). As a result, a non-metal material, or materials, can separate the sidewall components of the frame 202 from each other in order to electrically isolate the sidewall components. For example, separating materials 212, 214 can be position between sections of the frame 202. The aforementioned materials can include an electrically inert, or insulating, material(s), such as plastics and/or resin, as non-limiting examples. As discussed in greater detail below, the separating materials 212, 214 can be formed using similar manufacturing techniques as the frame 202. For instance, the separating materials 212, 214 can be formed using an additive manufacturing process.

The electronic device 200 can further include a display assembly 216 (shown as a dotted line) that is covered by a protective cover 218. The display assembly 216 can include multiple layers, with each layer providing a unique function. The display assembly 216 can be partially covered by a border 220 that extends along an outer edge of the protective cover 218 and partially covers an outer edge of the display assembly 216. In some examples, the border 220 can be a portion of the frame 202, being formed along with the frame 202. The border 220 can be positioned to hide or obscure any electrical and mechanical connections between the layers of the display assembly 216 and flexible circuit connectors. Also, the border 220 can exhibit a uniform thickness. For example, the border 220 can include a thickness that generally does not change in the X- and Y-dimensions.

Also, as shown in FIG. 2A, the display assembly 216 can include a notch 222, representing an absence of the display assembly 216. The notch 222 can allow for a vision system that provides the electronic device 200 with information for object recognition, such as facial recognition. In this regard, the electronic device 200 can include a masking layer with openings (shown as dotted lines) designed to hide or obscure the vision system, while the openings allow the vision system to provide the object recognition information. Also, the protective cover 218 can be formed from a transparent material, such as glass, plastic, sapphire, or similar transparent materials. In this regard, the protective cover 218 can be referred to as a transparent cover, a transparent protective cover, or a cover glass (when the protective cover 218 includes glass). As shown in FIG. 2A, the protective cover 218 includes an opening 224, which can represent a single opening of the protective cover 218. The opening 224 can allow for transmission of acoustical energy (in the form of audible sound) into the electronic device 200, which can be received by a microphone (not shown in FIG. 2A) of the electronic device 200. Further, the opening 224 can allow for transmission of acoustical energy (in the form of audible sound) out of the electronic device 200, which can be generated by an audio module (not shown in FIG. 2A) of the electronic device 200.

In some examples, the frame 202 can define a port 226 designed to receive a connector of a cable assembly. The port 226 allows the electronic device 200 to communication data information (send and receive), and also allows the electronic device 200 to receive electrical energy to charge a battery assembly. Accordingly, the port 226 can include terminals that electrically couple to the connector. The port 226 can be formed as part of the additive manufacturing process to form the frame 202 or can be formed by subsequent processing.

Furthermore, the frame 202 can define several openings. For example, the frame 202 can define openings 228 that allow an additional audio module (not shown in FIG. 2A) of the electronic device to emit acoustical energy out of the electronic device 200. The frame 202 can further define openings 232 that allow a microphone of the electronic device to receive acoustical energy. The frame 202 can define holes to receive fasteners. For instance, the electronic device 200 can also include a first fastener 234 and a second fastener 236 designed to be fastened to a rail that is coupled to the protective cover 218. In this way, the first fastener 234 and the second fastener 236 can be designed to couple the protective cover 218 with the frame 202. These various openings can be formed as part of an 3D printing process in conjunction with formation of the frame 202. In some examples, the openings are machined into the frame 202 after the frame 202 has been printed.

The electronic device 200 can include several control inputs designed to provide a command to the electronic device 200. For example, the electronic device 200 can include a first control input 242 and a second control input 244. The aforementioned control inputs can be used to adjust the visual information presented on the display assembly 216, and/or the volume of acoustical energy output by an audio module, as non-limiting examples. The controls can include one of a switch, a sensor, or a button designed to generate a command to a processor circuit. The control inputs can at least partially extend through openings in the sidewall components. For example, the second sidewall component 206 can include an opening 246 that receives the first control input 242. Further details of the electronic device 200 are provided below with reference to FIG. 2B.

Figure 2B:
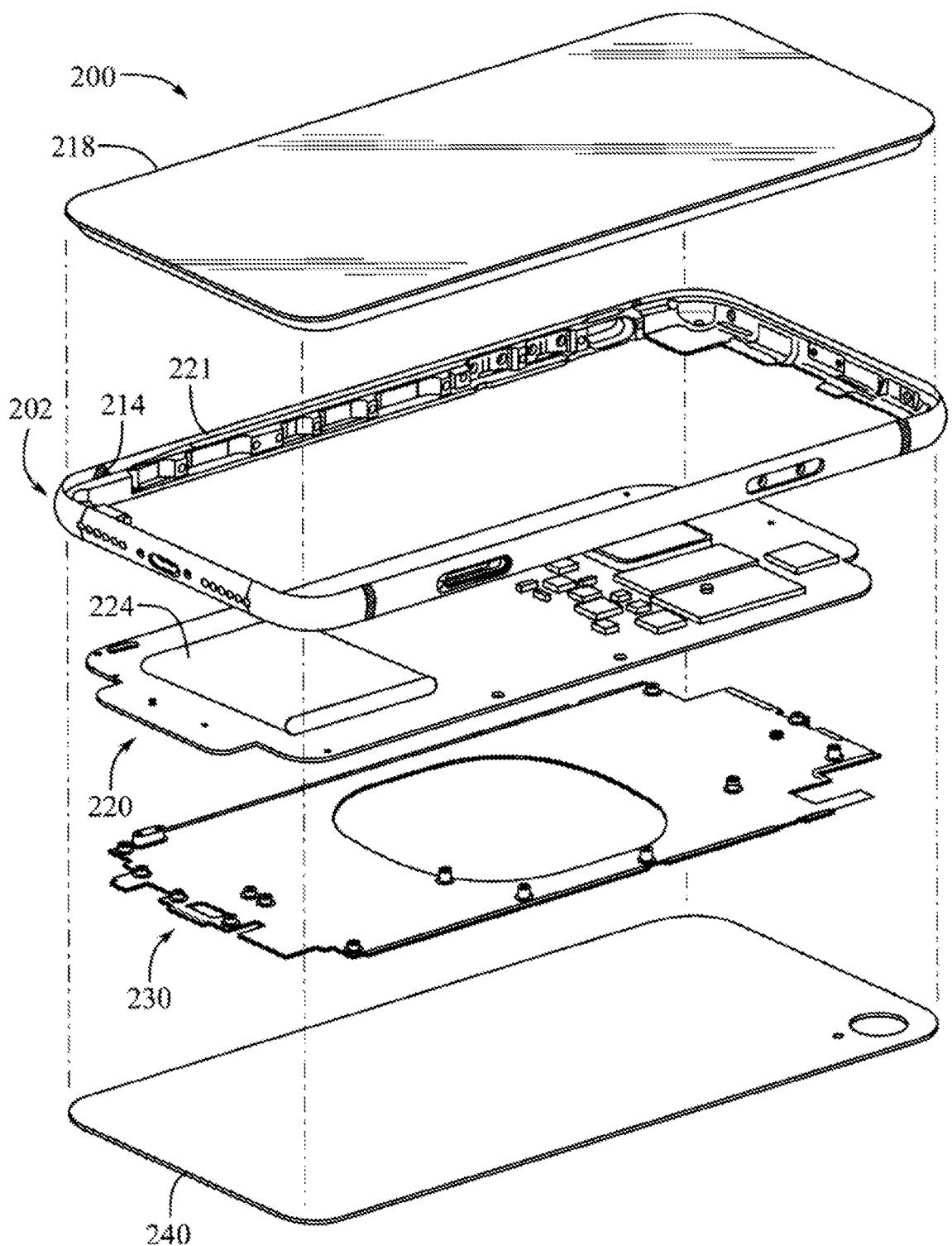
FIG. 2B shows an exploded view of the electronic device of FIG. 2A.

FIG. 2B illustrates an exploded view of the electronic device 200. As shown, the frame 202 at least partially defines an exterior portion, such as an outer perimeter of the electronic device. The frame 202, can include one or more features to receive or couple to other components of the device 200, such as feature 221. For example, the band 202 can include any number of features such as apertures, cavities, indentations, bosses, protrusions, and other mating features configured to receive and/or attach to one or more components of the device 200. In some examples, the feature 221 can be printed onto the frame 202 by an additive manufacturing process, as described herein. Further, in some examples, the feature 221 can include a metallic material different than the metallic material of the frame 202. In some examples, both the frame 202 and the feature 221 can be formed by one or more additive manufacturing processes, as described herein.

The electronic device 200 can include internal components such as processors, memory, circuit boards, batteries, and sensors. Such components can be disposed within an internal volume defined, at least partially, by the frame 202, and can be affixed to the frame 202, via internal surfaces, attachment features such as feature 221, threaded connectors, studs, posts, and/or other fixing features, that are formed into, defined by, or otherwise part of the frame 202.

The device 200 can include internal components, such as a system in package (SiP), including one or more integrated circuits such as a processors, sensors, and memory. The device 200 can also include a battery 224 housed in the internal volume of the device 200. The device 200 can also include one or more sensors, such as optical or other sensors, that can sense or otherwise detect information regarding the environment exterior to the internal volume of the device 200. Additional components, such as a haptic engine, can also be included in the device 200. In some examples, the display assembly can be received by and/or attached to the frame 202 by one or more attachment features.

The electronic device 200 can further include a chassis 220 that can provide structural support. The chassis 220 can include a rigid material, such as a metal, or can include a composite construction, as described herein. The chassis 220 can also be coupled to the frame 202. In this manner, the chassis 220 can provide an electrical grounding path for components electrically coupled to the chassis. The electronic device can alternatively or additionally include a back plate 230 having cladding layers and/or other attachment features such that one or more components of the electronic device 200 can be attached to the back plate 230, for example, via welding. The back plate 230 can form conductive pathways for connecting components of the electronic device 200. In some examples, the back plate 230 can be attached to the frame 202 of the device 200 by one or more attachment features. In some examples, the frame 202, the chassis 220, and the back plate 230 can be integrally formed with one another in any combination as a sectioned element by the additive manufacturing processes described herein.

An exterior surface of the electronic device 200 can further be defined by a back cover 240 that can be coupled with the frame 202. In this regard, the back cover 240 can combine with the frame 202 to form an enclosure or a housing of the electronic device 200, with the enclosure or housing (including frame 202 and back cover 240) at least partially defining an internal volume. The back cover 240 can include a transparent material, such as glass, plastic, sapphire, or another transparent material. As discussed below, the back cover 240 can be formed together with the frame 202 using an additive manufacturing process.

The housing, including the frame 202, can be conformable to interior dimensional requirements, as defined by the internal components. For example, the structure of the housing including a frame 202 can be defined or limited exclusively or primarily by the internal components the housing is designed to accommodate. That is, because a housing including a frame 202 can be extremely light and strong, the housing can be shaped to house the interior components in a dimensionally efficient manner without being constrained by factors other than the dimensions of the components, such as the need for additional structural elements. In some examples, these formation processes discussed herein can allow for the housing and/or frame 202 to have a detailed shape or design that is tailored specifically to satisfy one or more needs, such as internal dimensional requirements, without the need for additional features to reinforce the structure of the housing. Additionally, artifacts of the manufacturing process of the housing can be eliminated. Furthermore, other components of the electronic device 200, such as individual internal structural components like the chassis 220 or exterior input components, can be formed using the manufacturing techniques described herein.

Figure 2C:
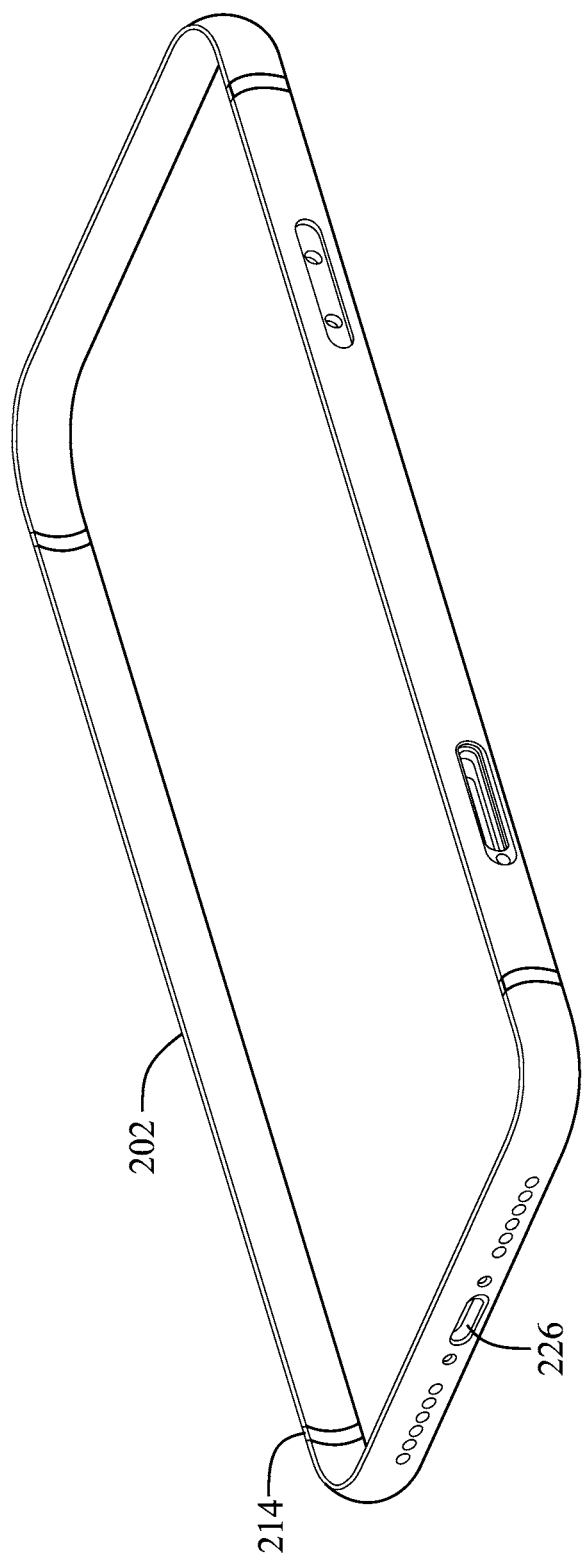
FIG. 2C shows a perspective view of an enclosure of the electronic device of FIG. 2A.

FIG. 2C shows a perspective view of the frame 202 of a housing or enclosure of electronic device 200, for example, electronic device 200 described with respect to FIGS. 2A and 2B. The frame 202 can represent a 3D metal printed structure that is partially or entirely formed using the additive manufacturing processes described herein. The illustration of FIG. 2C can be representative of the shape and design of the structure immediately after printing or can represent a finalized housing that has underdone additional subtractive machining.

In some examples, the frame 202 can have multiple composite sidewall components that are joined together. In some examples, the housing or enclosure for the electronic device 200 can include or can be formed from a single component having an interior portion including a first material, and exterior portion including a second, different material, as described herein. Further, in some examples, the components can form portions of the housing or enclosure other than the sidewalls, such as a top portion, a bottom portion, or any portion of the housing or enclosure. The frame 202 can include or can be formed from a metallic material, such as aluminum, titanium, stainless steel, or combinations thereof. For example, the frame 202 can include a stainless steel alloy, for example, a 316L stainless steel alloy. The frame 202 can also include a surface coating, such as a coating deposited by a physical vapor deposition process. Further details of electronic devices including components formed according to the processes described herein are described with respect to FIGS. 3A-3C.

Figure 3A:
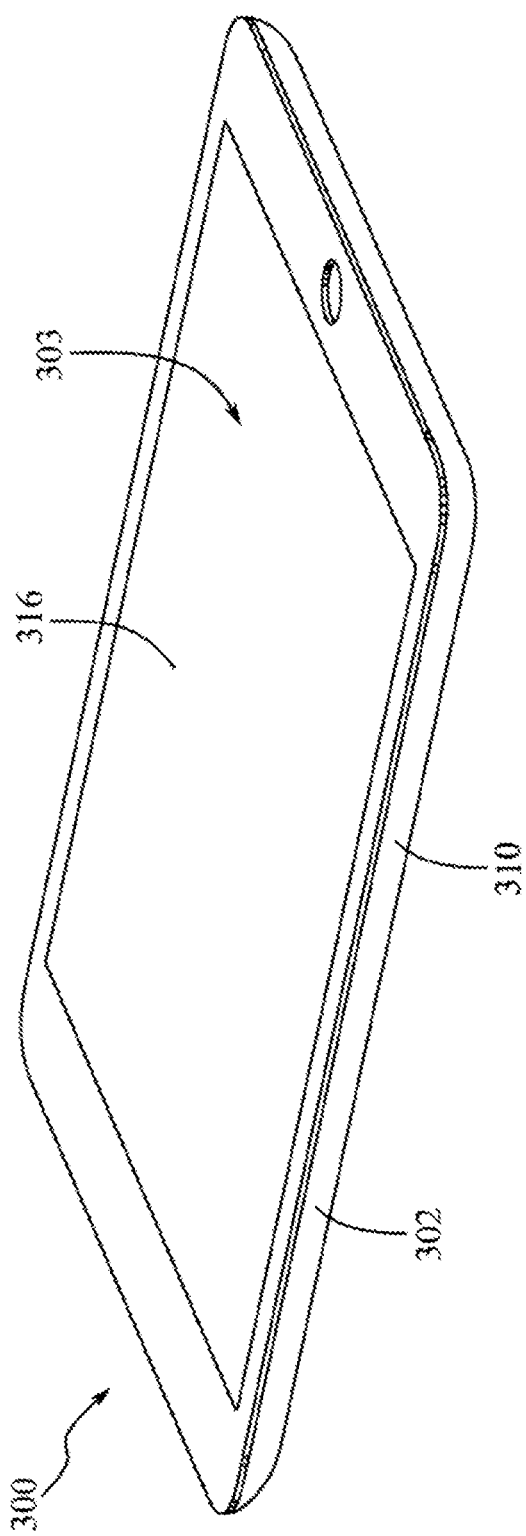
FIG. 3A shows a perspective view of an electronic device.

As shown in FIG. 3A, the present processes can also be used in the formation of a housing 302 for a tablet computer 300. As shown, the tablet computer 300 includes a front transparent cover 303 and a housing 302. The housing or enclosure 302 can be defined by a metallic component formed using additive manufacturing processes, as described herein.

The tablet computer of FIG. 3A is merely one representative example of a device that can be used in conjunction with the systems and methods disclosed herein. Electronic device 300 can correspond to any form of portable electronic device, a portable media player, a media storage device, a portable digital assistant ("PDA"), a tablet computer, a computer, a mobile communication device, a GPS unit, a remote control device, or other electronic device. The electronic device 300 can be referred to as an electronic device, a consumer device, or simply as a device.

Figure 3B:
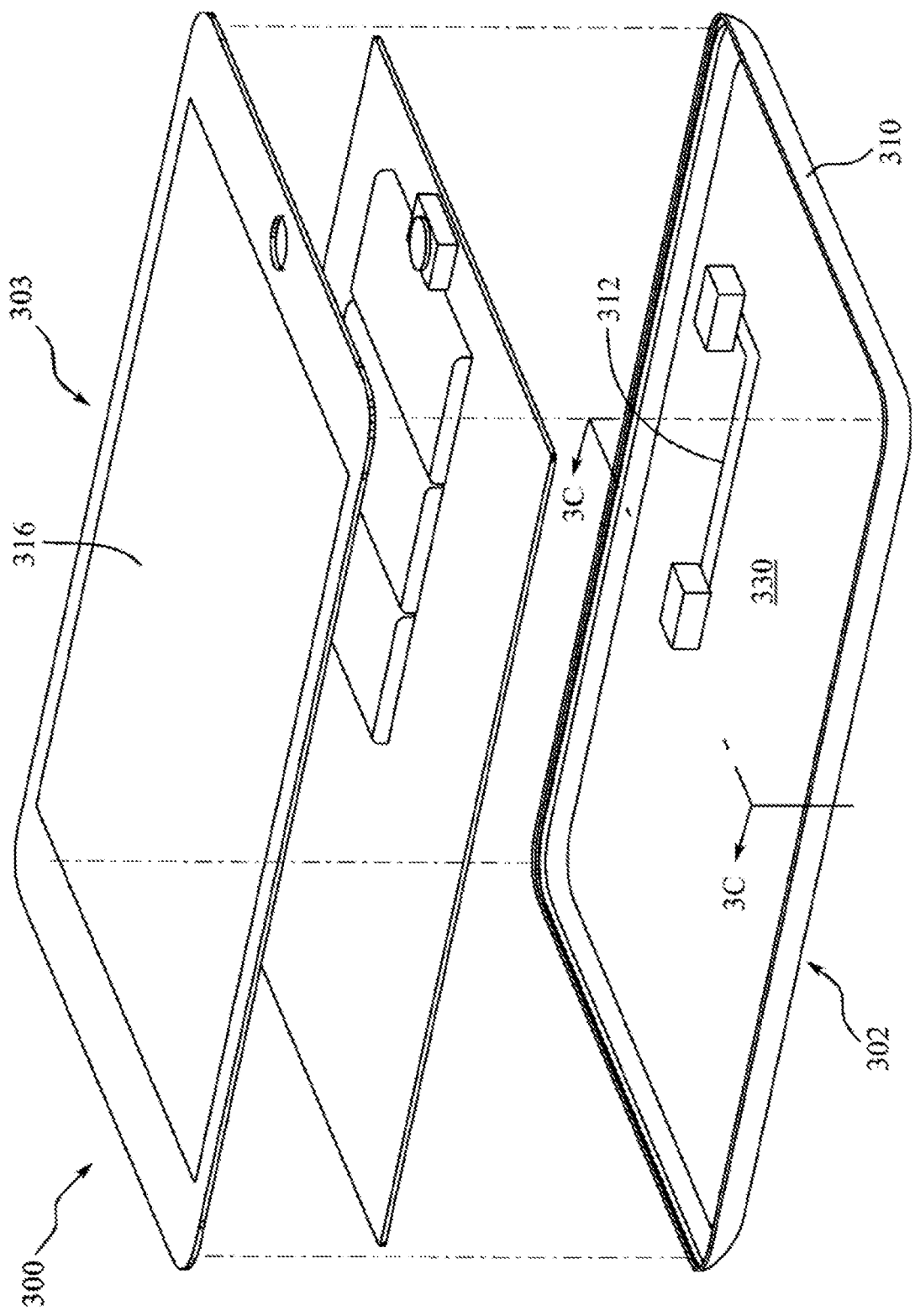
FIG. 3B shows an exploded view of the electronic device of FIG. 3A.

As shown in FIG. 3B, the electronic device 300 can have a housing 302 that includes a back plate 330 and a beveled edge or sidewall 310. The housing 302 can be formed using substantially similar methods used to form housing 102 and 202. The housing 302, or portions thereof, can be or can include a composite component including multiple different materials, as described herein. In some examples, the housing 302 can define one or more sidewall components 310 extending from the back plate 330. In some examples, the housing 302 defines a continuous or non-continuous perimeter of the electronic device 300. That is, in one example, the housing 302 can be formed with gaps or spaces therein.

In some examples, various features 312 can be printed onto the back plate 330. For example, the features 312 can include attachment features that are printed onto the back plate 330 to attach one or more components of the device 300 to the back plate 330. In some examples, the features 312 can include thermal/electrical pathways that are printed on the back plate 330 and are configured to operatively communicate with various components of the device 300. In some examples, the feature 312 can include ribs or other structural features. In some examples, the features 312 can be printed or can be formed onto an existing back plate 330, for example, by an additive manufacturing process, as described herein. In some examples, the back plate 330 can include a first metal and the features 312 can include the same metal, a second, different metal, or combinations thereof. In some examples, the first metal can include aluminum and the second metal can include steel, titanium, aluminum, or an alloy thereof. In some examples, however, the features 312 can be integrally formed with the back plate 330, for example, as part of a single additive manufacturing process, as described herein.

The electronic device 300 can further include a display assembly 316. The display assembly 316 can include multiple layers, with each layer providing a unique function. The display assembly 316 can include a protective cover formed from a transparent material, such as glass, plastic, sapphire, or similar transparent materials. In this regard, the protective cover can be referred to as a transparent cover, a transparent protective cover, or a cover glass. Also, the electronic device 300 can include, according to some examples, a button, such as "home button," commonly found in electronic devices.

In some examples, the housing 302 can define a port (not shown) designed to receive a connector of a cable assembly. The port can allow the electronic device 300 to communicate data information (send and receive), and also allows the electronic device 300 to receive electrical energy to charge a battery assembly. The port can be formed as part of the additive manufacturing process used to form the housing 302, or the port can be formed by subsequent subtractive manufacturing methods. Furthermore, the housing 302 can define several openings. For example, the housing 302 can define openings (not shown) that allow an additional audio module of the electronic device to emit acoustical energy out of the electronic device 300. The housing 302 can further define openings that allow a microphone of the electronic device to receive acoustical energy. The housing 302 can define holes to receive fasteners. These various openings can be formed as part of a 3D printing process in conjunction with formation of the housing 302. In some examples, the openings are machined into the housing 302 after it has been printed.

The housing 302 can include any number of features such as apertures, cavities, indentations, bosses, protrusions, and other mating features. The electronic device 300 can include internal components such as processors, memory, circuit boards, batteries, and sensors. Such components can be disposed within an internal volume defined, at least partially, by the housing 302, and can be affixed to the housing 302, via internal surfaces, attachment features, threaded connectors, studs, posts, and/or other fixing features, that are formed into, defined by, or otherwise part of the housing 302.

The housing 302 can include or be formed from one or more metallic materials, such as aluminum, titanium, stainless steel, or combinations thereof. For example, the housing 302 can include a stainless steel alloy, for example, a 316L stainless steel alloy. The housing 302 can also include a surface coating, such as a coating deposited by a physical vapor deposition process, as described herein.

Figure 3C:
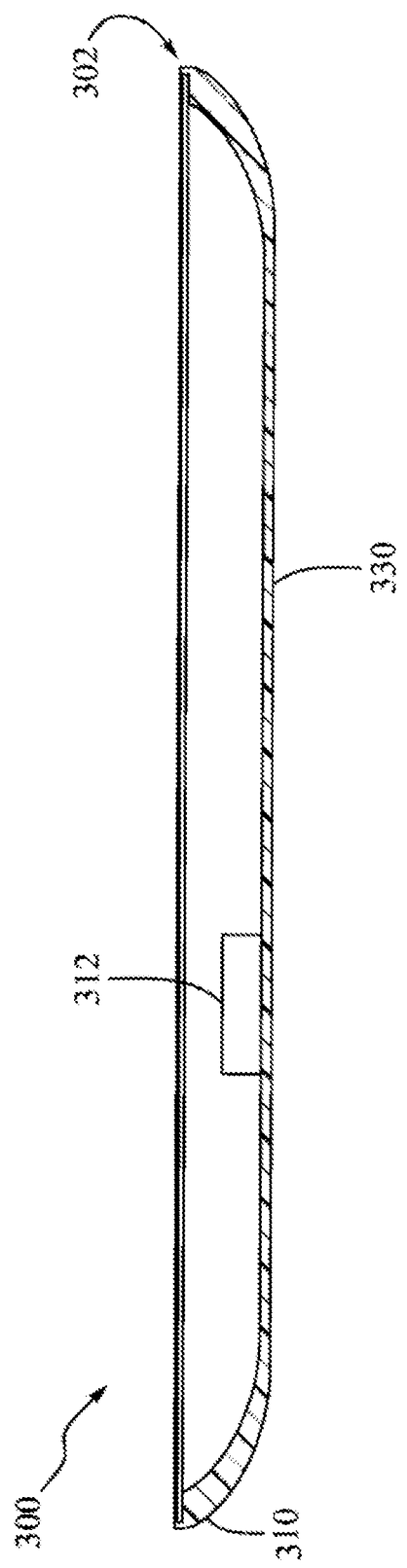
FIG. 3C shows a cross-sectional view of an enclosure of the electronic device of FIG. 3A.

FIG. 3C shows a cross-sectional view of the housing 302. As shown, the housing 302 can be formed from a single unitary piece of material, such as a single sectioned element, as described herein. The housing 302 can represent a 3D metal printed structure that is partially or entirely formed using the additive manufacturing processes described herein. The illustration of FIG. 3C can be representative of the shape and design of the structure immediately after printing, or can represent a finalized housing that has underdone additional subtractive machining. In some examples, the housing 302 can include multiple metallic materials that are formed together, as described herein. In some examples, the housing or enclosure for the electronic device 300 can include or can be formed form a single composite component having an interior and an exterior portion, as described herein. Further details of electronic devices including components formed according to the processes described herein are described below with respect to FIGS. 4A-4C.

Figure 4A:
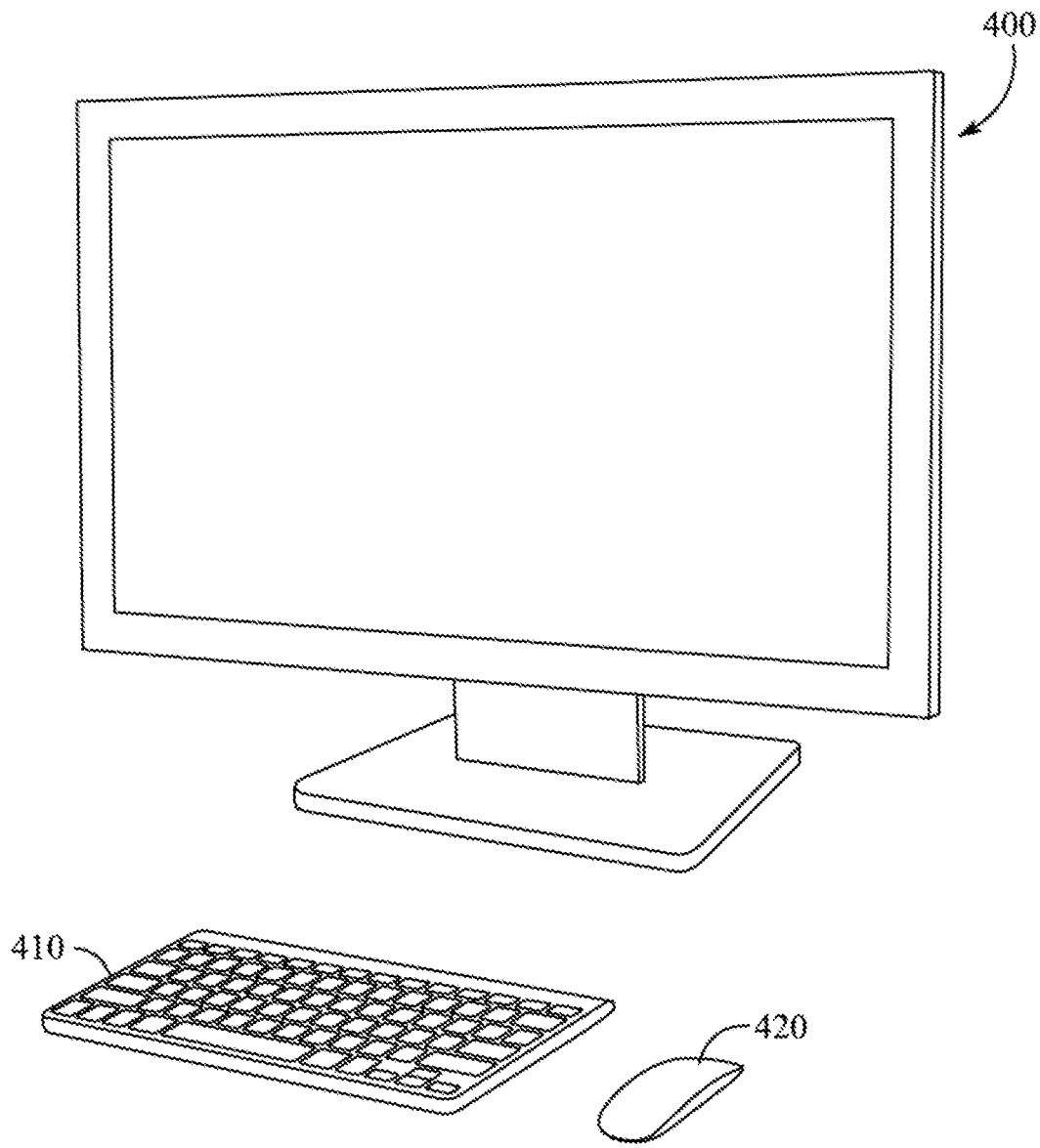
FIG. 4A shows a perspective view of an electronic device.

FIG. 4A shows an example electronic device 400 that can include a structural housing formed using additive manufacturing techniques, as detailed herein. The electronic device 400 shown in FIG. 4A is a display or monitor, for example, as can be used with a computer. This is, however, merely one representative example of a device that can be used in conjunction with the ideas disclosed herein. The electronic device 400 can, for example, correspond to a portable media player, a media storage device, a portable digital assistant ("PDA"), a tablet computer, a computer, a mobile communication device, a GPS unit, a remote-control device, or other electronic devices. The electronic device 400 can be referred to as an electronic device, a device, or a consumer device. As shown, the electronic device 400 can include any number of input devices such as a keyboard 410, a mouse 420, a track pad, a stylus, a microphone, or any combination of input devices. Further details of the electronic device 400 are provided below with reference to FIGS. 4B-4C.

Figure 4B:
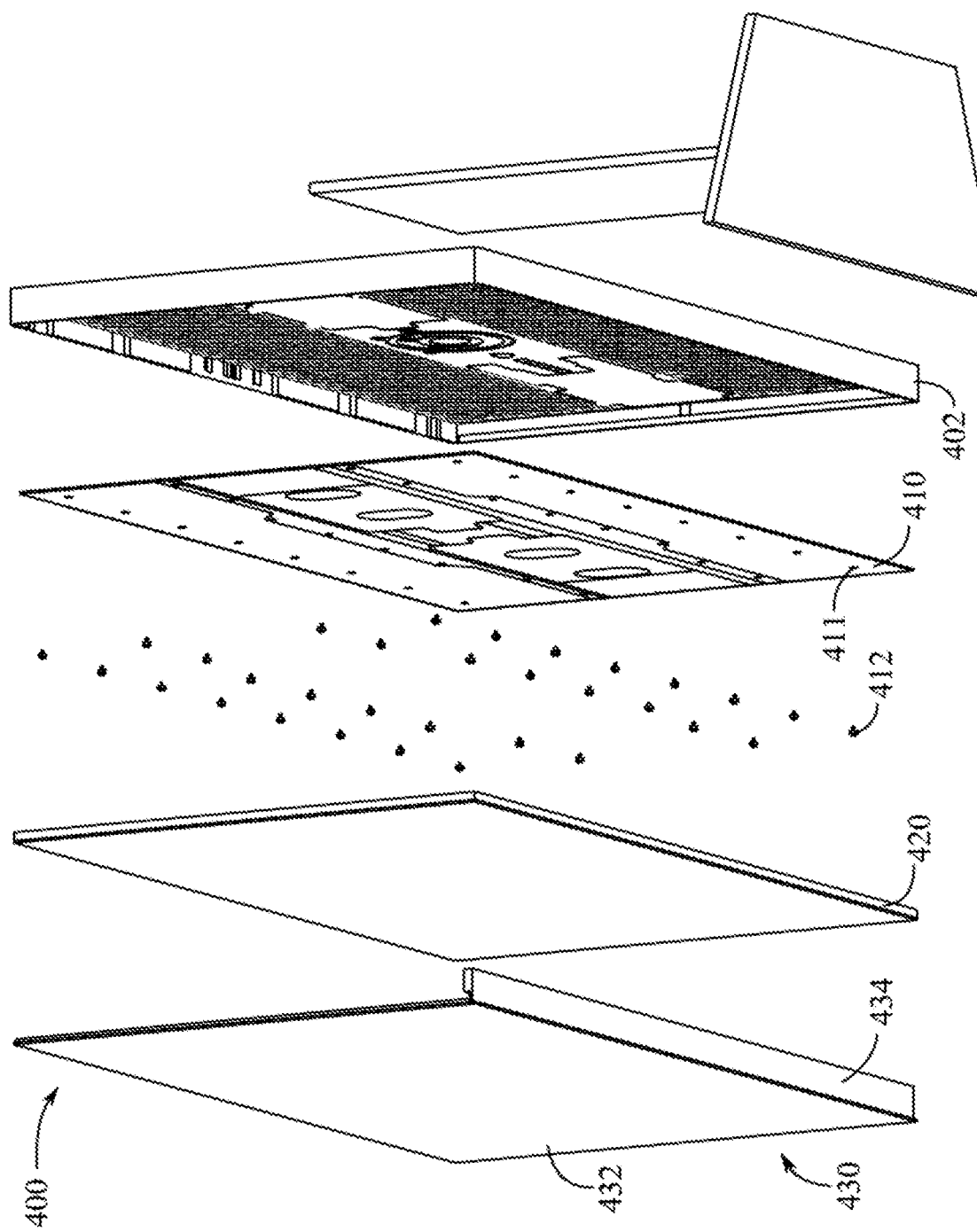
FIG. 4B shows an exploded view of the electronic device of FIG. 4A.

Referring now to FIG. 4B, the electronic device 400 can include a housing 402 at least partially defining an exterior surface and an internal volume of the device. In some examples, the housing can include a portion or a region that can include a body defining a first surface and a second surface. At least a portion of the body can include a three-dimensional pattern or matrix of apertures or passageways as described herein. In some examples, however, the housing 402 may not define any patterns or through-holes therein. The electronic device 400 can further include a back plate 410 that can be disposed adjacent to a major surface of the housing 402 at least partially defining the internal volume. The back plate 410 can be formed separately from the housing 402 or the back plate 410 can be formed together with the housing 402 to form a single unitary enclosure. In some examples, such as where the housing 402 includes a matrix of passageways, the back plate 410 can serve to seal the internal volume from an exterior or ambient environment that might otherwise be accessible through the passageways. In some examples, this seal can be substantially watertight or airtight and can prevent or significantly inhibit the passage of dust or other particulate matter from the ambient environment into the internal cavity of the device 400.

The back plate 410 can define one or more apertures 411 that can be sized to receive a portion of an engagement feature 412, for example, a post of an engagement feature 412, as described herein. In some examples, the engagement feature or features 412 can secure the back plate 410 to the housing 402 and can further seal the back plate 410 and the housing 402 at the location of the apertures 411. Although referred to separately as a housing 402 and a back plate 410, in some examples, the housing 402 and the back plate 410 are referred to together as a housing or enclosure.

The electronic device 400 can further include a display component 420, for example, a backlight unit 420. Although illustrated as a backlight unit, the display component 420 can include substantially any desired display or device component. In some examples, the backlight unit 420 can include internal components, such as one or more light emitting diodes (LEDs), cavity reflectors associated with the LEDs, internal posts that can define a thickness of the backlight unit, printed circuit boards, and a baseplate. A portion of the backlight unit 420, such as a rear major surface thereof, can define one or more retention features (not shown) that correspond to and can slidably engage with the engagement features 412 protruding from the back plate 410.

The electronic device 400 can also include a cover assembly 430. The cover assembly 430 can include a cover 432, which can at least partially define an exterior surface of the device 400. The cover can be any desired transparent material, for example, glass, plastic, sapphire, or other transparent materials. In some examples, a display unit can be adhered to the cover 432, for example, to a surface of the cover 432 opposite the surface defining an exterior surface of the device 400. In some examples, the display unit can be an LCD unit, although in other examples any desired form of display unit can be used, such as an LED display unit, OLED display unit, plasma display unit, quantum dot display unit, and other display units. The display unit can be affixed to the cover by gluing, adhering, or any other desired securing technique. Further, in some examples, the cover 432 can cover additional components such as a camera, or a touch sensitive surface such as a touchscreen.

The cover assembly 430 can further include a display component 434 extending from the cover 432. In some examples, the display component 434 can include one or more electronic components, such as printed circuit boards including processors, memory, and other electrical components, and can be referred to as daughterboards. The daughterboards 434 can be electrically connected to the display unit, for example, by a flexible electrical connector, and can drive or control the display unit. The daughterboards 434 can extend substantially perpendicularly from the cover 432, and can be mounted or affixed to the cover 432. In some examples, a bracket can be glued or otherwise affixed to the same side of the cover 432 as the display unit to maintain the daughterboards 434 in a position perpendicular to the cover 432. In some examples, the bracket can include metal, such as stainless steel. Additional electrical connectors (not shown), such as flexible electrical connectors, can extend from the daughterboards 434.

In an assembled state, the daughterboards 434 can be disposed in the internal volume in a space between the backlight unit 420 and a sidewall of the housing 402. The cover 432 can be fastened to the housing 402, for example, along a periphery thereof by a reworkable adhesive that can be provided through a gap between the exterior surface of the housing 402 and the cover 432. Any number of additional internal components can be disposed between the housing 402 and the cover assembly 430. The housing 402 can define at least a portion of an exterior surface of the device 400. The cover 432 can define a front exterior surface of the device 400. Together, the housing 402 and the cover 432 can substantially define the exterior surface and/or the internal volume of the device 400.

The device 400 can also include internal components such as processors, memory, circuit boards, batteries, fans, sensors, and other electronic components. Such components can be disposed within the internal volume defined at least partially by the housing 402 and the cover 432, and can be affixed to the housing 402 via internal surfaces, attachment features, threaded connectors, studs, or posts that are formed into, defined by, or otherwise part of the housing 402 and/or the cover assembly 430.

Figure 4C:
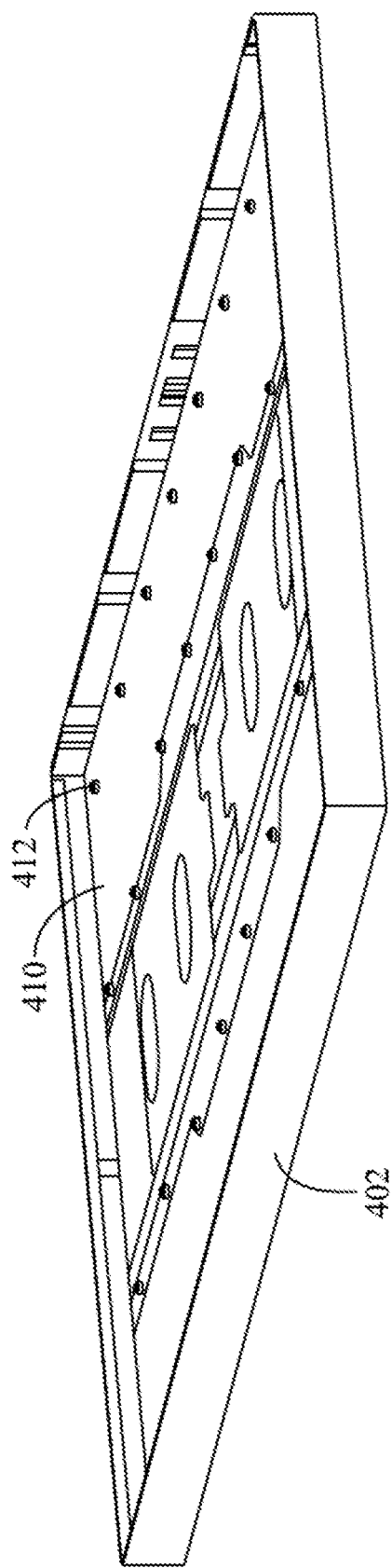
FIG. 4C shows a perspective view of an enclosure of the electronic device of FIG. 4A.

FIG. 4C shows a perspective view of the housing 402 including the back plate 410 affixed thereto, and one or more engagement features 412 passing through the back plate 410 and into the housing 402. The housing 402 can represent a 3D metal printed structure that is partially or entirely formed using the additive manufacturing processes described herein. The illustration of FIG. 4C can be representative of the shape and design of the structure immediately after printing, or can represent a finalized housing that has undergone additional subtractive machining.

While any number or variety of components of an electronic device, for example, any of electronic devices 100, 200, 300, and 400 can be formed using additive manufacturing processes, the housing of an electronic device can be, for example, formed by separating a section from an elongated body formed using direct metal deposition, as described herein. The structure, methods, and materials used in the formation of electronic device housings, as well as the formation of any features on those housings, can apply not only to the specific examples discussed herein, but to any number or variety of embodiments in any combination. Various embodiments of 3D metal printed structures are described below with reference to FIGS. 5-6D.

Figure 5:
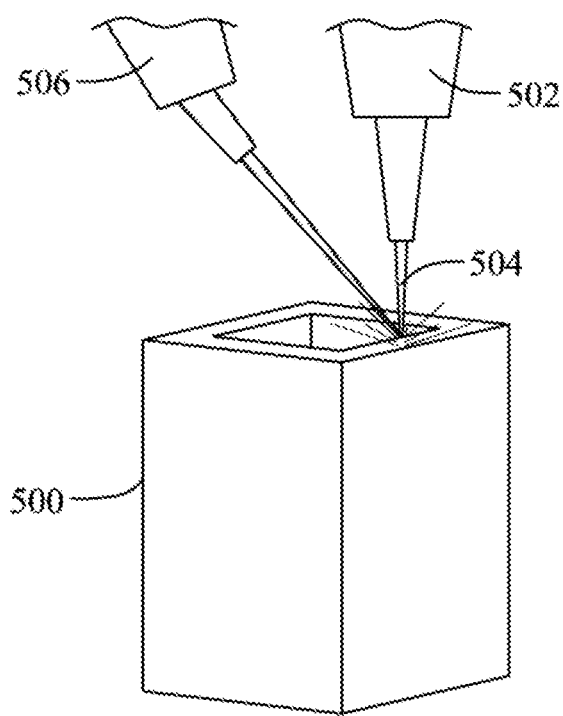
FIG. 5 shows a perspective view of a stage of an additive manufacturing process to form a structure.

FIG. 5 illustrates a stage in an example additive manufacturing process. Additive manufacturing, or 3D printing, can be used to form a three-dimensional (3D) component by depositing layers of a material. The materials used can include metals, plastics, and composite materials. Some processes use a powder or wire feedstock as the source material. In the example shown, a wire feedstock 504 is being deposited by a metal deposition nozzle 502. The wire feedstock 504 is layered upon itself to form an elongated structure 500. An energy or heat source 506 can be positioned separate from the metal deposition nozzle 502 to apply thermal energy to melt and bond the wire feedstock 504 to the structure 500. In some examples, the energy source 506 can be a laser or plasma arc to create a melt pool on the stack or elongated structure 500 and can aid in the deposition of the metal powder or wire. In some examples, the energy source can be a thermal source, a resistive heat source, a frictional heat source, any other form of heat source, or combinations thereof, as desired. Example methods of 3D metal printing that can be used to form the structures described herein, such as sectionable structures, include Direct Metal Deposition (DMD), Laser Metal Deposition (LMD), Direct Energy Deposition (DED), Selective Laser Sintering (SLS), Direct Metal Laser Sintering (DMLS), Electron beam melting (EBM) and Selective laser melting (SLM).

Figure 6A:
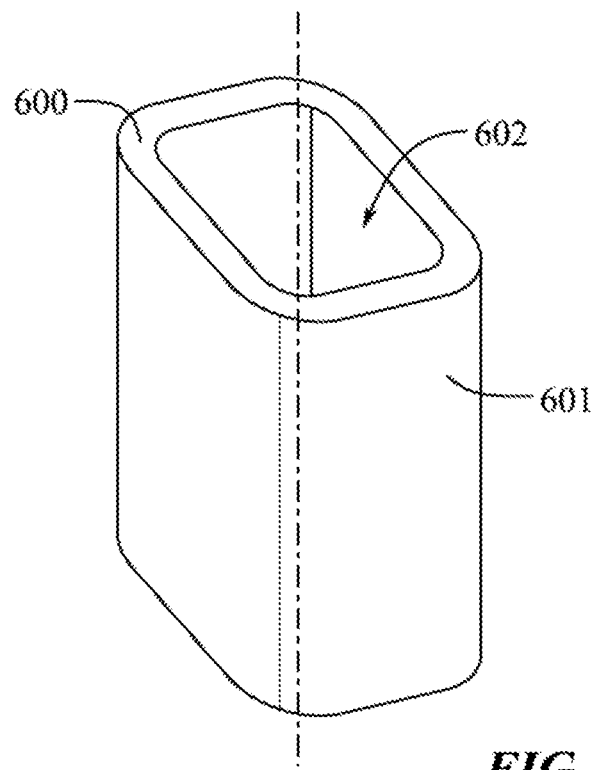
FIG. 6A shows a perspective view of an elongated structure.

FIG. 6A shows a perspective view of an elongated structure 600. The elongated structure 600 can be formed using additive manufacturing processes, such as direct metal deposition, as described above, and can be substantially similar to the structure 500. The elongated structure 600 can include sidewalls 601 that define an orifice or opening 602. In some examples, the opening 602 extends along a longitudinal axis (shown with a dotted line) of the elongated structure 600. The elongated structure 600 can be oblong, for instance, assuming a tube-like or cylindrical shape. That is, a cross-section in the horizontal plane is less than a cross-section in the vertical plane. In some examples, however, the structure 600 can have a regular or symmetrical cross-sectional shape. In some examples, the structure 600 can have any desired peripheral or cross-sectional shape with symmetrical or varying sidewall dimensions, such as rectangular, circular, triangular, or combinations thereof. In some examples, the opening 602 can extend only partially along the longitudinal axis of the elongated structure 600. In some examples, the opening 602 can be machined or modified with additional processing after formation of the elongated structure 600. Further details of the elongated structure 600 are discussed below with reference to FIGS. 6B-6D.

Figure 6B:
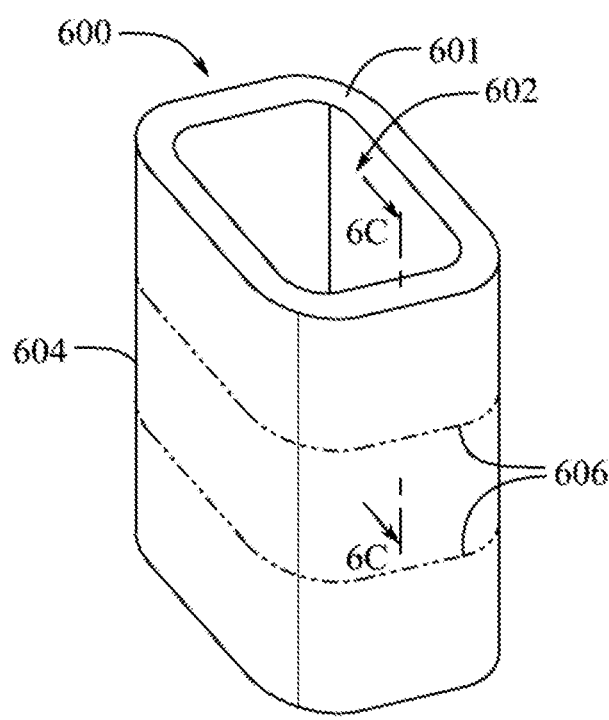
FIG. 6B shows a perspective view of the elongated structure of FIG. 6A including separable sections.

FIG. 6B illustrates the elongated structure 600 including section lines 606 (represented as dashed lines) around the elongated structure 600. In some examples, the elongated structure 600 is divisible into separate sectioned elements 604 along these section lines 606. In some examples, once divided into a plurality of sectioned elements 604, each sectioned element can include a section surface where it had previously been joined to the structure 600, for example, at the section lines 606. Each sectioned element 604 can be identical or substantially similar to one another. In some examples, there can be intentional differences between the sectioned elements 604 of the elongated structure 600. The section lines 606 can be formed in the elongated sidewall 601 itself. Specifically, the elongated structure 600 can be formed with physical variations at the section lines 606. In some examples, there is no variation or difference in the structure of the sidewall 601 and the section lines 606 merely represent where the elongated structure 600 is to be divided. The elongated structure 600 can be divided by any suitable systems or methods, such as slicing, cutting, pulling apart, shearing, chopping, or any other method or combination of methods to separate the elongated structure 600 into its sectioned elements 604 at desired locations 606. In some examples, separation processes can be mechanical, thermal, electro-magnetic, chemical, or combinations thereof.

Figure 6C:
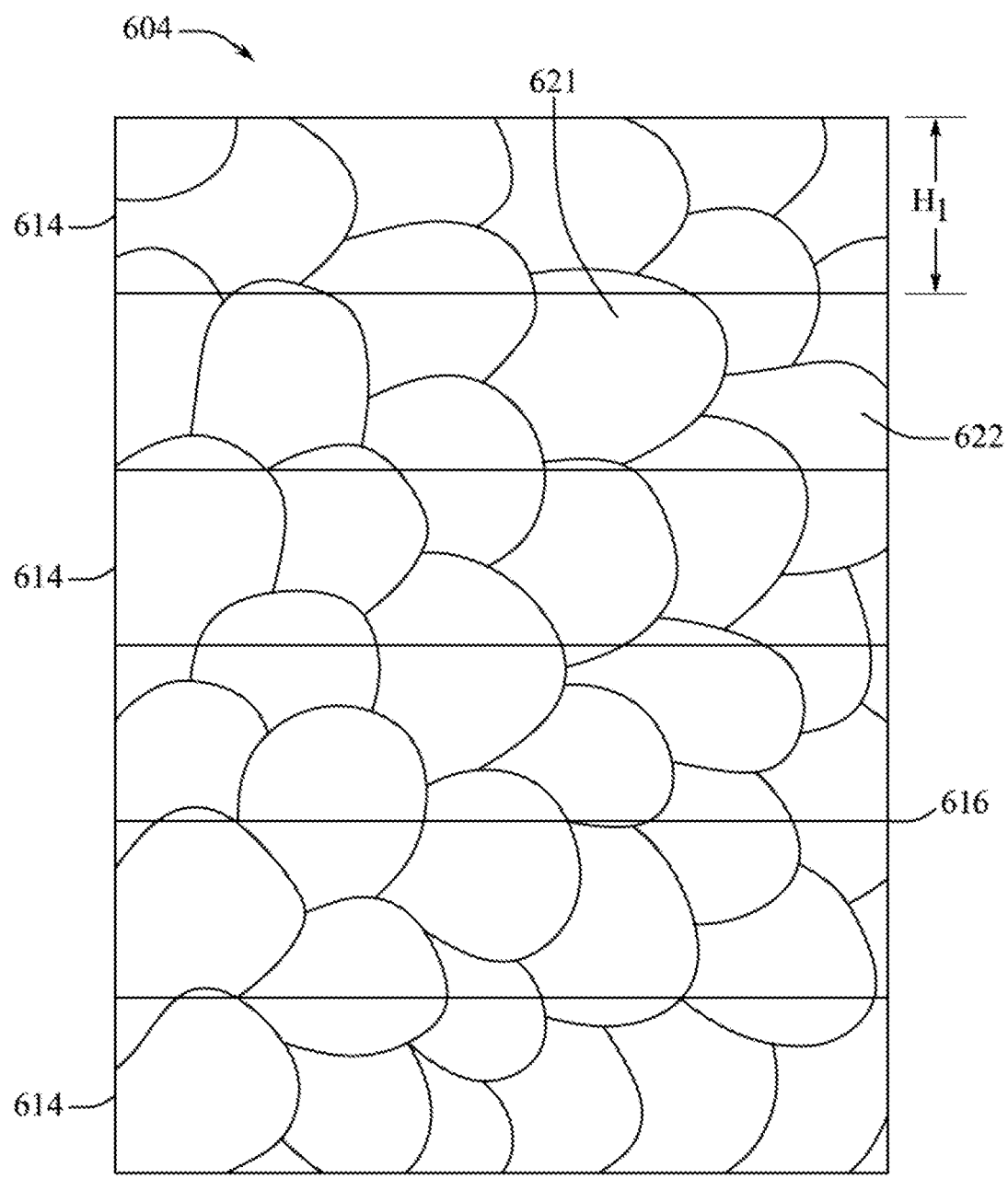
FIG. 6C shows a cross-sectional view of a portion of the elongated structure of FIG. 6A.

FIG. 6C illustrates a cross-section of a single sectioned element 604 of the elongated structure 600. As can be seen, and as described herein, the elongated structure 600, and the sectioned element 604 can be formed from multiple build layers 614 that are deposited over one another in a molten form, for example, by a direct metal deposition process. In some examples, the elongated structure 600 and each sectioned element 604 can include any desired number of build layers. In some examples, each build layer 614 can have a substantially similar thickness or height H1, as the other build layers 614. In some examples, however, the height of each build layer can vary, as desired. In some examples, the height H1 of a build layer be from about 0.1 mm to about 5 mm, from about 0.25 mm to about 2.5 mm, or from about 0.5 mm to about 1 mm.

In some examples, the elongated structure 600 and sectioned element 604 can have a metallic grain structure including multiple crystal grains, such as grains 621, 622. In some examples, and as illustrated in FIG. 6C, the sectioned element 604 can include substantially equiaxial crystal grains. Although the size and shape of the crystal grains 621, 622 can vary, in some examples the crystal grains 621, 622 can have a substantially similar size and shape. In some examples, the sectioned element 604 can include equiaxial grains having an average major dimension of from about 0.1 mm to about 10 mm.

In some examples, components formed from the additive manufacturing processes described herein, such as the elongated structure 600 and the sectioned element 604, can include a substantially random and/or uniform distribution of equiaxial crystal grains 621, 622 throughout the entire elongated structure 600 and sectioned element 604. In some examples, all or substantially all of the crystal grains 621, 622 of the sectioned element 604 can be equiaxial. In contrast, metallic components or structures that are formed by methods such as forging or extrusion can include regions where material has flowed or been distorted, resulting in elongated or distorted crystal grains in various regions of the structure, and causing the structures formed by these processes to lack a substantially uniform or random distribution of equiaxial grains, or to include some equiaxial crystal grains and some elongated or distorted grains.

In some examples, the sectioned element 604 can include striations 616 or other visual or microstructural artifacts or features between each of the build layers 614. Without being bound by any one theory, it is believed that these artifacts 616 or features between build layers 614 can be at least partially due to the re-melting of an existing build layer 614 when a new build layer 614 is deposited or formed thereover during an additive manufacturing process, as described herein. In some examples, the separation between each build layer 614 can be visualized as a distortion between the crystal grain structure or microstructure of the material of adjacent build layers 614. In some examples, these striations or variations can be present even when the crystal grains 621, 622 of the sectioned element 604 extend between build layers 614. In some examples, each build layer 614 can be separate from an adjacent build layer 614 by variations in the density or porosity of the sectioned element 604. That is, an interface region between adjacent build layers 614 can have a lower density and/or a higher porosity than each of the adjacent build layers 614.

Figure 6D:
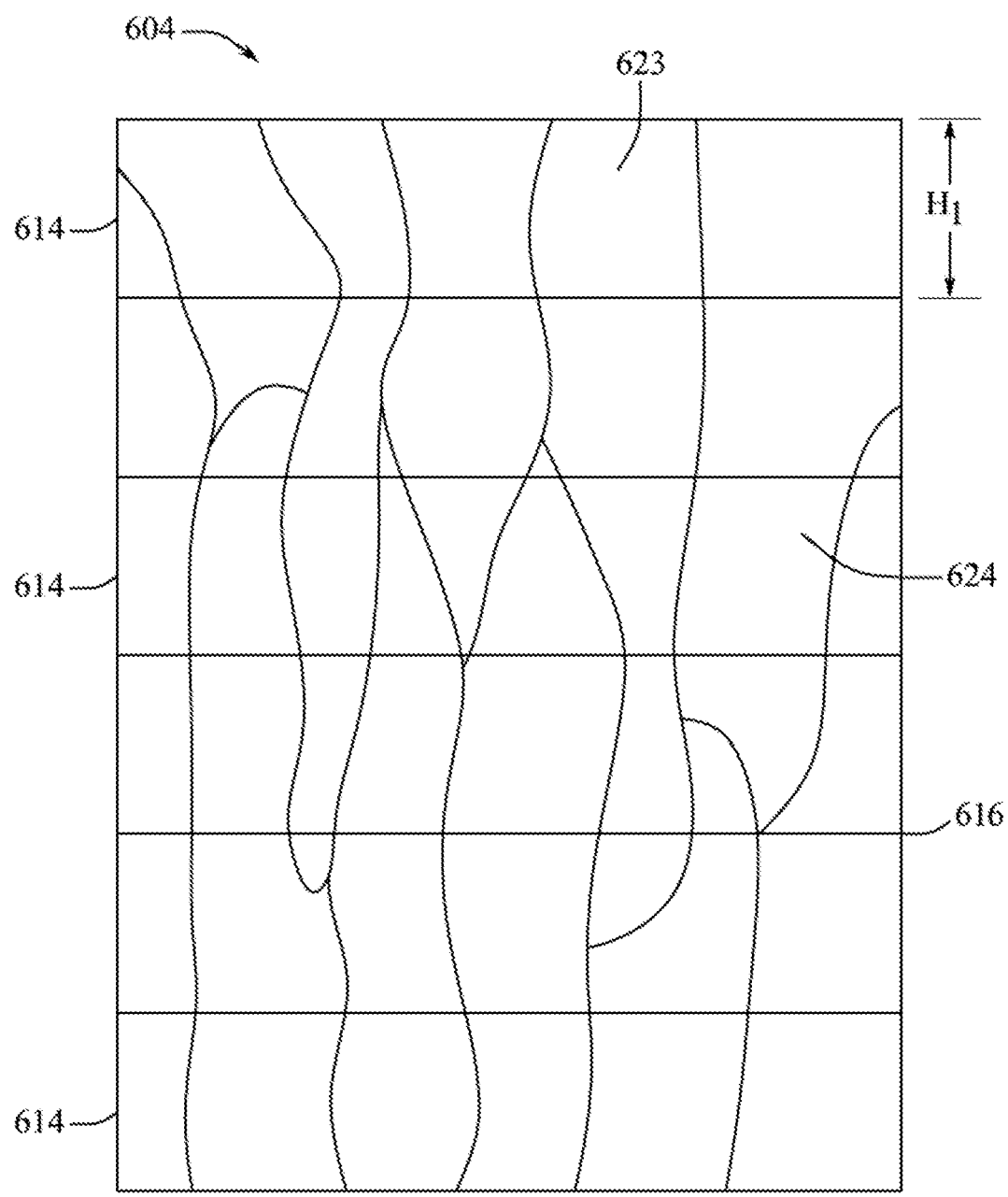
FIG. 6D shows an alternative cross-sectional view of a portion of the elongated structure of FIG. 6A.

FIG. 6D illustrates a cross-section a single sectioned element 604 of the elongated structure 600, similar to the cross-section illustrated in FIG. 6C, but including an alternative possible crystal grain structure. Whereas the sectioned element 604 illustrated in FIG. 6C included a substantially uniform distribution of equiaxial crystal grains 621, 622, in some examples the sectioned element 604 can include a relatively uniform distribution of columnar crystal grains 623, 624 throughout the entire elongated structure 600 and sectioned element 604. In some examples, all or substantially all of the crystal grains 623, 624 of the sectioned element 604 can be columnar. In some examples, the columnar grains 623, 624 can extend through one or more build layers 614, as shown. In some examples, the columnar grains 623, 624 can have a substantially similar size and/or shape. In some examples, the columnar grains 623, 624 can have a major dimension, or length, of from about 1 mm to about 10 mm, 15 mm, 20 mm, or even longer.

Figure 6E:
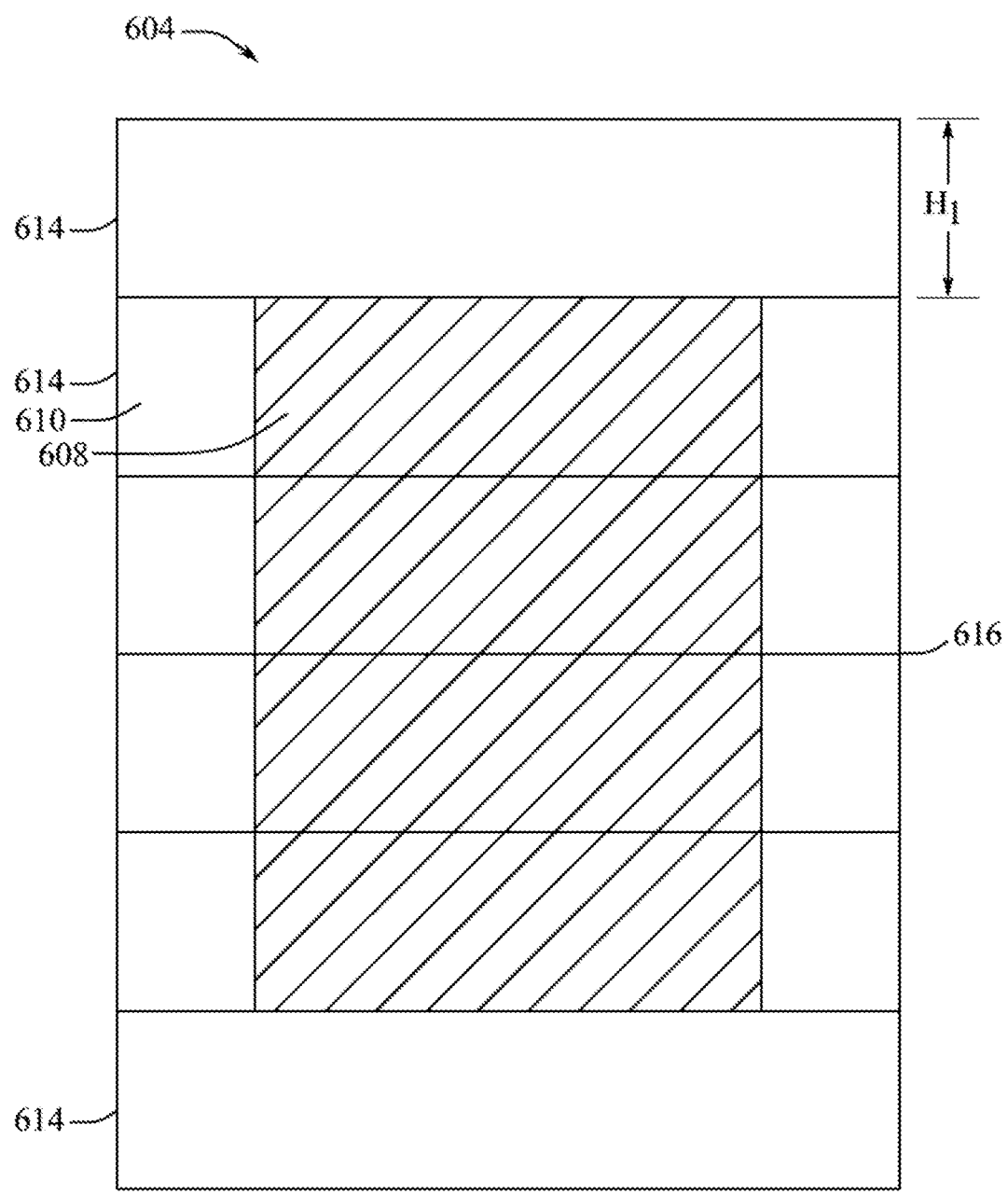
FIG. 6E shows an alternative cross-sectional view of a portion of the elongated structure of FIG. 6A.

FIG. 6E illustrates a cross-section a single sectioned element 604 of the elongated structure 600, similar to the cross-sections illustrated in FIGS. 6C and 6D. As described herein, in some examples, the elongated structure 600 and sectioned element 604 can include two or more metallic materials, such as a first metal 610 and a second, different metal 608. Although not shown in FIG. 6E, each of the first metal 610 and the second metal 608 of the sectioned element 604 can nevertheless include an equiaxial or columnar crystal grain structure as described with respect to FIGS. 6C and 6D. In some examples, the first metal 610 can entirely surround the second metal 608, although in some other examples, the second metal 608 can at least partially defined an exterior surface of the sectioned element 604. Further, in some examples, an individual build layer 614 can include both the first metal 610 and the second metal 608. In some examples of a sectioned element 604 including first and second metals 610, 608, each build layer may only include a single metal. In some examples, the first metal 610 can include copper, aluminum, steel, titanium, or alloys thereof. In some examples, the second metal 608 can include copper, aluminum, steel, titanium, or alloys thereof. In some examples, the first metal 610 can include a first alloy of a metal, while the second metal 608 can include a second, different alloy of the same metal. Further details of the structure of sectioned elements formed by additive manufacturing processes are described with respect to FIGS. 7A and 7B.

Figure 7A:
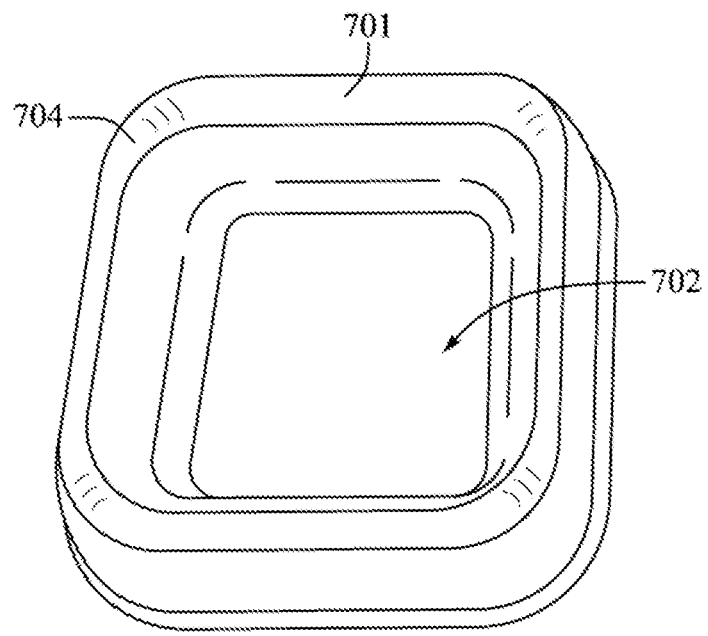
FIG. 7A shows a top view of a section separated from an elongated structure.

FIG. 7A illustrates a sectioned element 704 that has been separated from the elongated structure 700. The sectioned element 704 can be a blank, a forging stock, a slug, a multiple, or any other raw material stock. The section element 704 can approximate a final shape of a component for an electronic device, such as housings 100, 200, 300, 400 and 600 described with reference to FIGS. 1A-6E. Further detail of the methods and processes for forming the structure 700 are described below with reference to FIG. 7B.

Figure 7B:
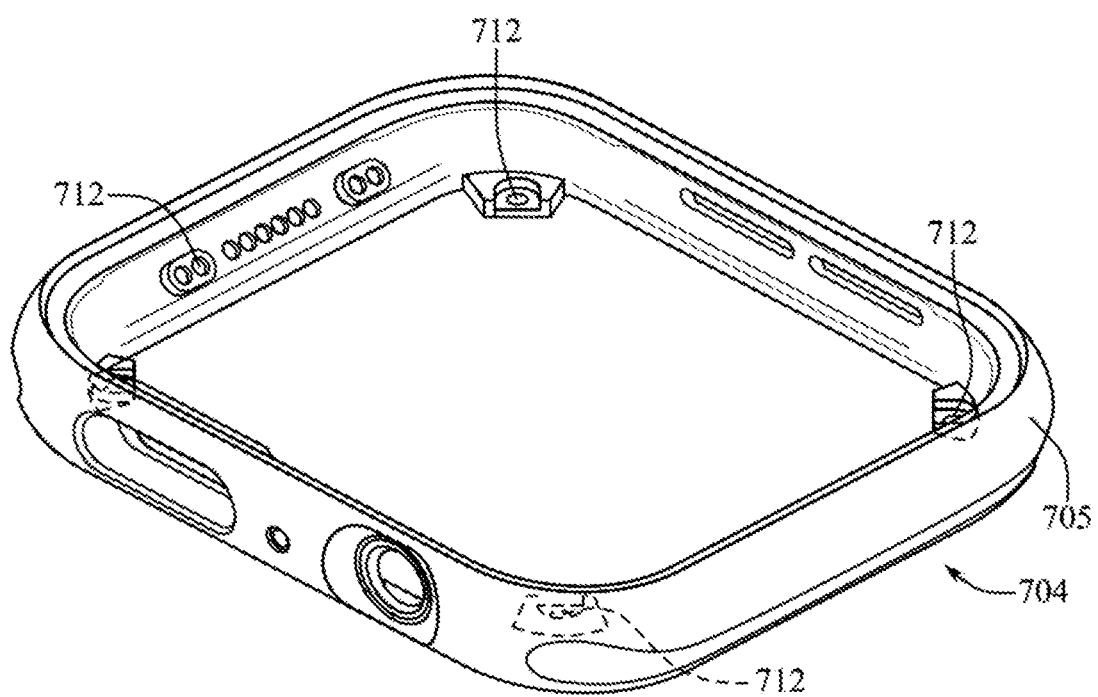
FIG. 7B shows a perspective view of the section of FIG. 7A after being subject to additional processing.

FIG. 7B illustrates the sectioned element 704 after being finished or finalized into a housing 705 for an electronic device. The housing 705 can be substantially similar to any of the housings described herein, such as the housing 100 shown above with reference to FIGS. 1A-1C. The sectioned element of FIG. 7A can undergo any suitable additive or subtractive manufacturing processes to form the finalized housing 705 shown in FIG. 7B. The housing 705 can define various features 712 such as protrusions indentations holes, bosses, ridges, etc. Such features 712 can be formed using an additive manufacturing process or can be machined into or otherwise formed in the housing 705 after the elongated structure 700 is printed. In some examples, the features 712 are printed concurrently with the elongated structure 700. In some examples, the features 712 are printed onto the sectioned element 704.

While any number or variety of components of an electronic device, for example, any of electronic devices 100, 200, 300, and 400, can be formed using additive manufacturing processes, the housing of an electronic device can be, for example, formed by separating a section from an elongated body formed using direct metal deposition, as described herein. The structure, methods, and materials used in the formation of electronic device housings, as well as the formation of any features on those housings, can apply not only to the specific examples discussed herein, but to any number or variety of embodiments in any combination. Various embodiments of a 3D metal printed structure formed by multiple metals are described below with reference to FIGS. 8A and 8B.

Figure 8A:
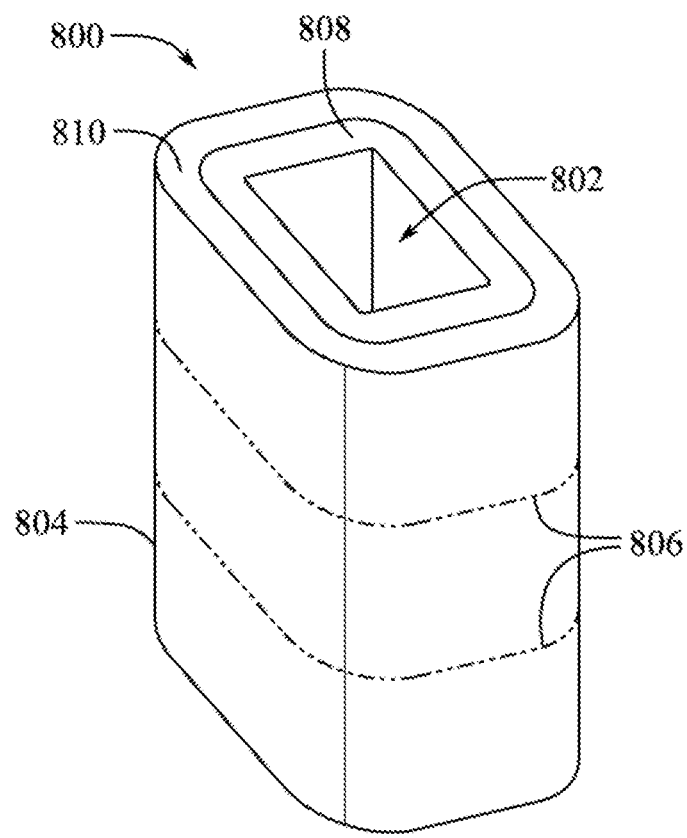
FIG. 8A shows a perspective view of a sectionable composite structure.
Figure 8B:
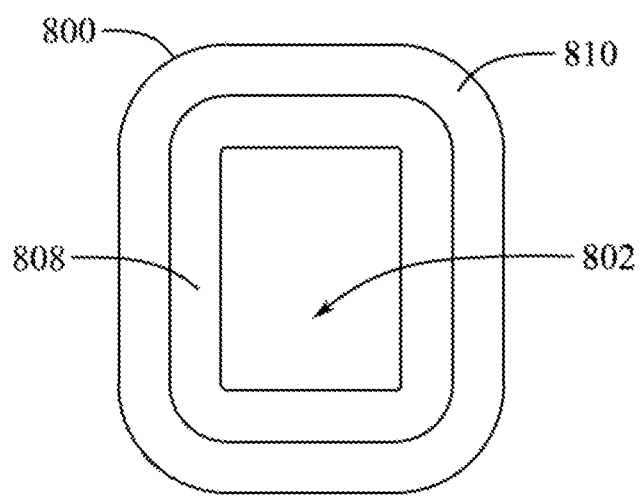
FIG. 8B shows a top view of a section separated from the sectionable composite structure of FIG. 8A.

FIGS. 8A and 8B illustrate an elongated structure 800. In certain aspects, the elongated structure 800 can be substantially similar to, and can include some or all of the features of the elongated structures described herein, such as the sectionable elongated structure 600, discussed above. The elongated structure 800 can include two or more portions that include different materials, such as different metallic materials that are integrally formed into the structure 800 during the additive manufacturing processes described herein.

The elongated structure 800 can define an orifice or opening 802. In some examples, the opening 802 extends along a longitudinal axis of the elongated structure 800. In some examples, the elongated structure 800 is divisible into separate sectioned elements 804 along section lines 806. In some examples, there can be intentional differences between the sectioned elements 804 of the elongated structure 800. The section lines 806 can be formed in the elongated sidewall itself, that is, the elongated structure 800 can be formed with physical variations at the section lines 806 such as a surface finish, indentation, or other physical indicator. In some examples, however, there is no variation or difference in the structure of the sidewall and the section lines 806 merely represent where the elongated structure 800 is to be divided. The elongated structure 800 can be divided by any suitable systems or methods, such as slicing, cutting, pulling apart, shearing, chopping, or any other method or combination of methods to separate the elongated structure 800 into its sectioned elements 804 at desired locations 806. In some examples, separation processes can be mechanical, thermal, electro-magnetic, chemical, or combinations thereof.

In some examples, the exterior portion 810 can include a metallic material, such as stainless steel, although other materials are expressly contemplated, as described herein. In some examples, the exterior portion 810 can have a thickness greater than about 25 microns. The interior portion 808 can have a second, different set of material properties that are independent of the first set of material properties of the outer portion 810. In some examples, the interior portion 808 can thus include a second, different metallic material. In some examples, the exterior portion 810 and the interior portion 808 can both be formed or deposited by an additive manufacturing process, as described herein. In some examples, the portions 808, 810 can be formed simultaneously by a single additive manufacturing process. In some examples, the portions 808, 810, can be formed separately or by multiple additive manufacturing processes or passes of a single additive manufacturing process.

The exterior portion 810 and the interior portion 808 can include any desired shape or design, and thus, the component 800 can include any desired shape or design. In some examples, the component 800 can be a portion of a housing of an electronic device. In other examples, however, the component 800 can be any component of an electronic device, such as a structural component, an internal component, an external component, and/or any other component.

The interior portion 808 of the composite component 800 can be selected such that it has a set of material properties that are desirable for the formation of features. For example, the material of the interior portion 808 can be selected to have a material property, or set of material properties, that allow for the interior portion 808 to be highly machinable without causing high levels of wear on machining tools. Additionally, the material of the interior portion 808 can be relatively inexpensive so that waste material produced by forming the features does not substantially increase production costs. Further, the material of the exterior portion can be selected to have a material property, or a set of material properties, independent of the material properties of the interior portion, that allow the exterior portion 810 to have, for example, high levels of hardness and corrosion resistance.

The exterior portion 810 can have a substantially curved shape or profile (not shown) that can correspond to an exterior profile of the electronic device. The exterior portion 810 can have any desired shape or profile. In some examples, where the exterior portion has a substantially curved shape or profile, the interior portion 808 can be positioned entirely behind or within a curve defining the curved profile of the exterior portion 810.

The elongated structure 800 can be formed from multiple metals. For example, a first metal 808 can define an interior surface of the elongated structure 800 which further defines an aperture 802. An exterior of the first metal 808 can define an interface to couple with a second metal 810. The second metal 810 can be clad onto the first metal 808 such that the second metal 810 substantially surrounds the first metal 808. In some examples, however, the second metal 810 may only be disposed on desired portions of the surface of the first metal 808. For example, the second metal 810 can be printed or formed at one or more separate or discrete portions of the first metal 808. In some examples, the second metal 810 can define an exterior surface of the elongated structure 800. In some examples, the first metal 808 and the second metal 810 can each be formed using similar or identical additive manufacturing processes. The first metal 808 can be entirely printed before printing of the second metal 810 begins. For instance, the second metal 810 can be printed around an exterior perimeter of the first metal 808. In some examples, the second metal 810 is printed in its entirety and the first metal 808 can be printed in an interior of the second metal 810. In some examples, an additive manufacturing machine can be configured to deposit the first metal 808 and the second metal 810 simultaneously. For example, a machine can include two or more metal deposition nozzles to deposit multiple metals concurrently. In some examples, the printing mechanism can be configured to alternate between the first metal 808 and the second metal 810. In other words, the 3D printer can be configured to switch between different types of metals, depending on what portion of the elongated structure 800 is being printed. The first metal 808 and the second metal 810 can be integrally formed with one another and can be diffusion bonded, welded, joined, or otherwise secured to one another by the deposition process.

Although the example illustrated in FIGS. 8A and 8B includes two portions 808, 810 that define an interior and exterior of the structure 800, respectively, in some examples the structure 800 can include two or more portions of different metallic materials arranged in any desired configuration. For example, the first portion 808 can at least partially define an interior surface and an exterior surface of the structure 800, while the second portion 810 can also at least partially define an interior surface and an exterior surface of the structure 800. In some examples, these structures can be achieved by transitioning the material including the feedstock during the printing process at one or more desired times. In some examples, the structure 800 can include multiple discrete first portions 808 that can be separated by, and joined to, one or more discrete second portion 810. Additionally, although the present example details a structure including a first portion 808 and a second portion 810, the structure 800 can include any number of portions formed from any number of different metals.

While any number or variety of components of an electronic device, for example, any of electronic devices 100, 200, 300, and 400 can be formed using additive manufacturing processes, the housing of an electronic device can be, for example, formed by separating a section from an elongated body formed using direct metal deposition, as described herein. The structure, methods, and materials used in the formation of electronic device housings, as well as the formation of any features on those housings, can apply not only to the specific examples discussed herein, but to any number or variety of embodiments in any combination. Various embodiments of 3D metal printed structures have features formed therein are described below with reference to FIGS. 9A-10C.

FIG. 9A illustrates an elongated structure or stack 900 including features 912 formed on an interior surface of the structure 900. An aperture 902 is defined by the elongated structure. In certain aspects, the elongated structure 900 can be similar to, and can include some or all of the features of the elongated structures 600, 700, and 800 discussed herein. The elongated structure 900 can be formed using the additive manufacturing processes discussed herein. In some examples, the exterior and/or interior of the elongated structure 900 can be curved or shaped non-linearly and can include one or more protruding or recessed features.

As shown in the cross-sectional view of FIG. 9B, the interior sidewalls of the structure 900 can include features 912. The features 912 can include any number apertures 902, cavities, indentations, bosses, protrusions, or any other feature configured to interact with one or more components of an electronic device. Advantageously, the features 912 and overall shape of the elongated structure 900 can be formed directly into the structure during the printing process. This can reduce or remove the need for additional processing or machining after formation or separation of the sectionable elements 904. In some examples, the structure 900 can be formed as described with respect to structures 600, 700, 800, and the features 912 can be subsequently printed onto the structure 900 at desired locations. In some examples, however, the structure 900 and features 912 are formed by a single process. The elongated body 900 can be separated along section lines 906 to produce individual sectioned elements 904, as described herein. The ability to print features directly into or onto the sectioned units 904 during the additive manufacturing process can reduce material waste and operating costs.

In some examples, the features 912 can be formed in one or both of the exterior and/or the interior of the elongated structure 900. In some examples, the features 912 can act as an attachment feature for other components of the electronic device. The feature 912 can be configured to receive components of an electronic device, such as buttons or input components. Although depicted as protrusions, the features 912 can take any desired form or shape. In some examples, the feature 912 can extend, at least partially, into the interior sidewall to a desired depth. In some examples, the feature 912 can extend substantially through an entire thickness of the sidewall. In some examples, the features 912 can have a major dimension from about a micron up to about a millimeter, or several millimeters, or more.

Figure 10B:
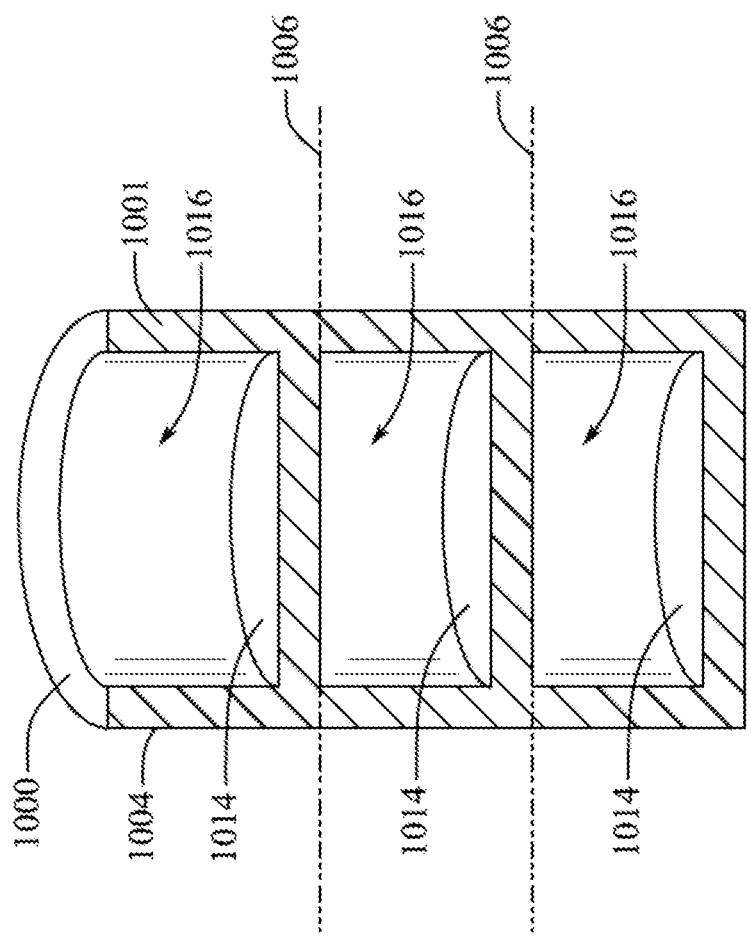
FIG. 10B shows a cross-sectional view of the sectionable structure of FIG. 10A.
Figure 10A:
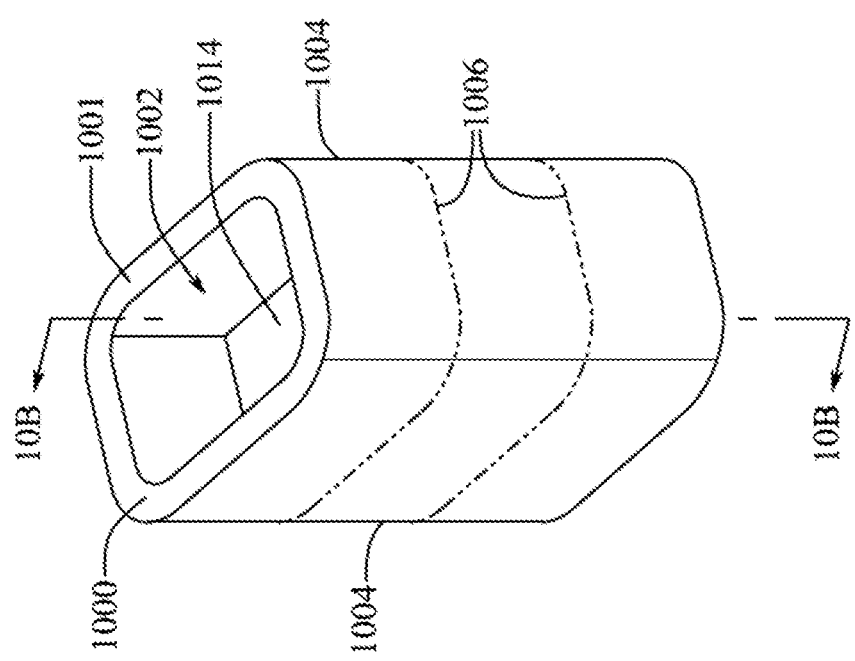
FIG. 10A shows a perspective view of a sectionable structure including sections having back walls.

FIG. 10A illustrates an elongated structure 1000 formed using the additive manufacturing processes described herein. In certain aspects, the elongated structure 1000 can be similar to, and can include some or all of the features of the elongated structures 600, 700, 800, and 900 described herein. The elongated structure 1000 can be divisible into sectioned elements 1004 along section lines 1006. The elongated structure 1000 can include one or more walls 1014 that extend between the sidewalls 1001 of the elongated structure 1000, effectively closing aperture 1002 at desired locations on each sectionable element 1004. In some examples, the wall 1014 can be considered a back wall 1014. As shown in FIG. 10B, the elongated structure 1000 can include a plurality of back walls 1014. The back walls 1014, together with the sidewall 1001, can at least partially define volumes 1016. The back walls 1014 can be formed using the additive manufacturing processes described herein to form a single unitary element 1004 of the structure 1000. In some examples, the back walls 1014 are printed concurrently with the sidewalls of the elongated structure 1000. In some examples, the back walls 1014 added after formation of the sidewalls of the elongate structure 1000. In some examples, a back wall 1014 can be substantially perpendicular to the longitudinal axis of the elongated structure 1000. In some examples, however, a back wall 1014 can be disposed at substantially any angle relative to the longitudinal axis. Further, although the back wall 1014 is depicted as completely occluding the aperture 1002 at desired locations, in some examples, the back wall 1014 can define any number of features such as protrusions, apertures, holes, or orifices.

Figure 10C:
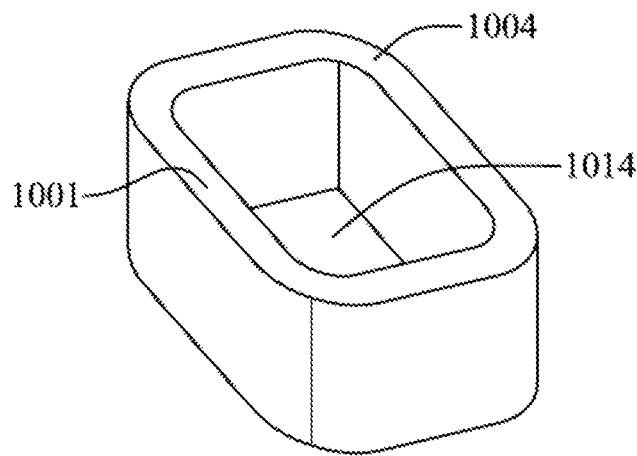
FIG. 10C shows a perspective view of a section separated from the sectionable structure of FIG. 10A.

FIG. 10C illustrates a single sectioned element 1004 that has been separated from the elongated structure 1000 of FIGS. 10A and 10B, as described herein. The sectioned element 1004 includes a back wall 1014 and sidewalls 1001 that extend from a periphery of the back wall 1014 to define a volume or an enclosure. In some examples, the enclosure formed by the back wall 1014 and the sidewalls 1001 can be used as a housing of an electronic device, for example, as any of the housings described herein. In some examples, the sectioned element 1004 can represent a 3D metal printed structure that is partially or entirely formed using the additive manufacturing processes described herein. The illustration of FIG. 10C can be representative of the shape and design of the structure immediately after printing or can represent a finalized housing that has underdone additional processing, such as subtractive machining.

While any number or variety of components of an electronic device, for example, any of electronic devices 100, 200, 300, and 400, can be formed using additive manufacturing processes, the housing of an electronic device can be, for example, formed by separating a section from an elongated body formed using direct metal deposition, as described herein. The structure, methods, and materials used in the formation of electronic device housings, as well as the formation of any features on those housings, can apply not only to the specific examples discussed herein, but to any number or variety of embodiments in any combination. Various methods of forming 3D metal printed structures are described below with reference to FIGS. 11 and 12.

Figure 11:
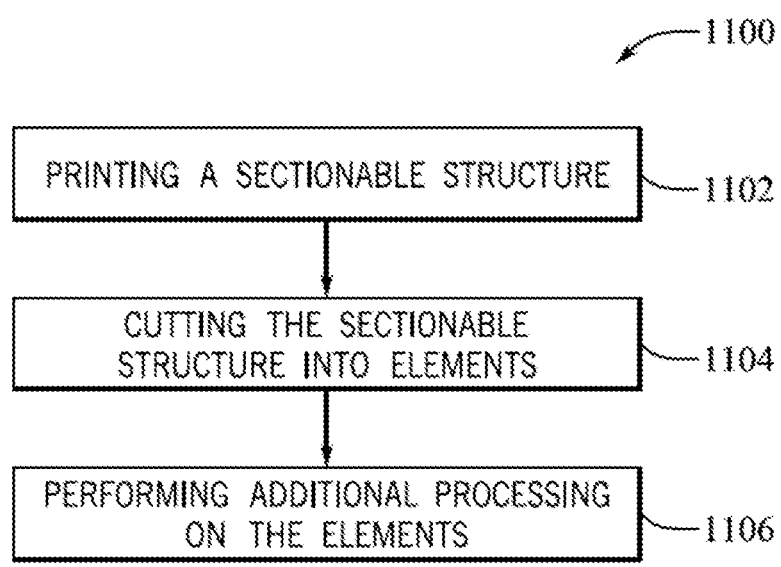
FIG. 11 shows a process flow diagram of a method for forming sectioned elements from a sectionable structure.

FIG. 11 illustrates a process flow diagram of a method 1100 for forming a 3D printed sectionable structure, such as any of the structures described herein. At block 1102, a sectionable structure can be printed. Printing of the sectionable structure can be done using additive manufacturing processes, as described herein. At block 1104, the sectionable structure can be cut or separated into individual sectioned elements. Division of the structure can be done using any known or yet to be discovered methods, for example, as described herein. At block 1106, the sectioned elements can undergo additional processing, such as additional additive manufacturing processing to form or print features thereon, or additional subtractive manufacturing techniques, such as machining to form features, or achieve a desired surface finish or shape.

Figure 12:
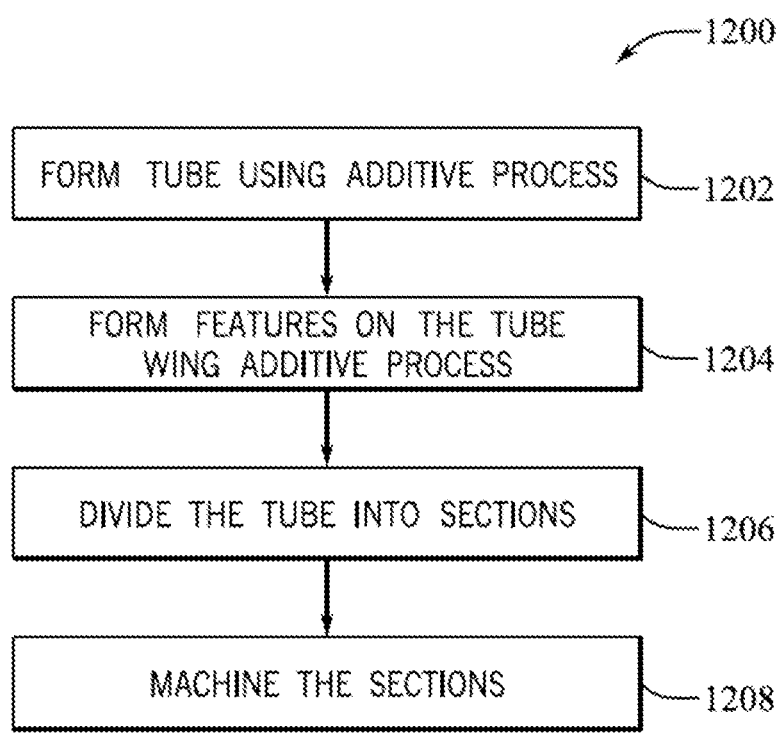
FIG. 12 shows a process flow diagram of a method for forming electronic device enclosures from a sectionable structure.

FIG. 12 illustrates a process flow diagram of a method 1200 to form a divisible tube into blanks using additive manufacturing techniques, as described herein. At block 1202, an elongated structure, such as a tube or other structure defining an orifice as described herein, can be formed using an additive process. At block 1204, various features can be formed on one or more surfaces of the tube either using the additive manufacturing process that forms the tube, an additional additive manufacturing process, or through subtractive processing of the tube, such as machining. That is, during formation of the tube itself, the additive manufacturing process can be used to form additional features on the interior or exterior of the tube. At block 1206, the tube can be divided into sections, as described herein. At block 1208, the divided sections can undergo additional processing, such as subtractive manufacturing processes like machining and/or additional additive manufacturing processes.

Any of the features or aspects of the components, devices, and methods discussed herein can be combined or included in any varied combination. For example, any methods of forming a sectionable structure, sectioned element or component for an electronic device can be used in combination to form any component, as described herein. The steps, stages, or blocks of any of the methods described herein can be performed in any desired order and can be performed simultaneously, if desired. Further, a housing of a device can be formed from a sectionable structure, as described herein, that can include one or more features formed therein. Any method can be used to form such a feature or features. Although certain methods and components are described with respect to housings, enclosures, or frames for electronic devices, the methods and components described herein can also be or form any number of additional components of an electronic device, including internal components, external components, cases, surfaces, or partial surfaces. As used herein, the terms exterior, outer, interior, and inner are used for reference purposes only. An exterior or outer portion of a component can form a portion of an exterior surface of the component, but may not necessarily form the entire exterior of outer surface thereof. Similarly, the interior or inner portion of a component can form or define an interior or inner portion of the component, but can also form or define a portion of an exterior or outer surface of the component.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A structure, comprising:
a metallic three-dimensional (3D) printed elongated body defining a continuous orifice;
wherein:
the elongated body comprises a plurality of sectionable elements, each sectionable element of the plurality of sectionable elements including a section location defining where each sectionable element is configured to be divisible from an adjacent sectionable element;
each sectionable element defines the continuous orifice at the sectionable location; and
the elongated body comprises a first metal and a second metal, the second metal different from the first metal.

2. The structure of claim 1, wherein the continuous orifice extends along a longitudinal axis of the elongated body.

3. The structure of claim 1, wherein the elongated body comprises a physical variation on a surface of the elongated body between each of the plurality of sectionable elements.

4. The structure of claim 3, wherein:
the physical variation defines the section location; and
each of the plurality of sectionable elements are substantially identical.

5. The structure of claim 1, wherein the elongated body is non-symmetrical about an axis.

6. The structure of claim 1, wherein the elongated body comprises a plurality of internal features disposed on a sidewall at least partially defining the continuous orifice, and the internal features are integrally formed with the sidewall.

7. The structure of claim 1, wherein each of the plurality of sectionable elements comprises:
a back wall; and
a sidewall that extends from a periphery of the back wall, the sidewall and the back wall at least partially defining a housing for an electronic device.

8. The structure of claim 1, wherein the first metal at least partially defines an exterior surface of the elongated body; and
the second metal at least partially defines the continuous orifice.

* * * * *